(12) United States Patent
Goda et al.

(10) Patent No.: US 11,637,288 B2
(45) Date of Patent: Apr. 25, 2023

(54) THERMALLY CROSSLINKABLE BINDER AQUEOUS SOLUTION FOR LITHIUM-ION BATTERY, THERMALLY CROSSLINKABLE SLURRY FOR LITHIUM-ION BATTERY NEGATIVE ELECTRODE, NEGATIVE ELECTRODE FOR LITHIUM-ION BATTERY, LITHIUM-ION BATTERY NEGATIVE ELECTRODE MATERIAL, AND LITHIUM-ION BATTERY AND METHOD FOR PRODUCING THE SAME

(71) Applicant: ARAKAWA CHEMICAL INDUSTRIES, LTD., Osaka (JP)

(72) Inventors: Hideki Goda, Osaka (JP); Naoki Sasagawa, Osaka (JP); Shinji Ozaki, Osaka (JP); Satoru Aoyama, Osaka (JP); Katsuya Okubo, Osaka (JP); Katsuhiko Ikeyatsu, Osaka (JP)

(73) Assignee: ARAKAWA CHEMICAL INDUSTRIES, LTD., Osaka (JP)

( * ) Notice: Subject to any disclaimer, the term of this patent is extended or adjusted under 35 U.S.C. 154(b) by 392 days.

(21) Appl. No.: 16/902,279

(22) Filed: Jun. 16, 2020

(65) Prior Publication Data
US 2020/0395615 A1 Dec. 17, 2020

(30) Foreign Application Priority Data

Jun. 17, 2019 (JP) .............................. JP2019-111646
Jun. 17, 2019 (JP) .............................. JP2019-111648

(51) Int. Cl.
*H01M 4/62* (2006.01)
*H01M 4/04* (2006.01)
(Continued)

(52) U.S. Cl.
CPC ........... *H01M 4/622* (2013.01); *C08F 220/06* (2013.01); *C08F 220/28* (2013.01);
(Continued)

(58) Field of Classification Search
CPC ..... C08F 220/06; C08F 220/28; C08F 220/56
See application file for complete search history.

(56) References Cited

U.S. PATENT DOCUMENTS 3,176,187 A * 3/1965 Sola ........................ H05B 41/46
315/97
4,294,939 A * 10/1981 Taniguchi .......... C09D 133/066
525/118
(Continued)

FOREIGN PATENT DOCUMENTS

CN 106146730 B * 7/2018
CN 109679414 A * 4/2019 ............ C08F 212/08
(Continued)

OTHER PUBLICATIONS

Machine translation of JP 2013-168323 (no date).*
(Continued)

*Primary Examiner* — Amanda C. Walke
(74) *Attorney, Agent, or Firm* — JCIPRNET

(57) ABSTRACT

Provided are a thermally crosslinkable binder aqueous solution for a lithium-ion battery, a thermally crosslinkable slurry for a lithium-ion battery negative electrode, a negative electrode for a lithium-ion battery, a lithium-ion battery negative electrode material, as well as a lithium-ion battery and a method for producing the same. The present disclosure provides a thermally crosslinkable binder aqueous solution for a lithium-ion battery, containing water-soluble poly (meth)acrylamide (A) and having a pH of 5 to 7, wherein the water-soluble poly(meth)acrylamide (A) is a polymer of a monomer group containing, with respect to 100 mol % of the
(Continued)

monomer group, 2 mol % to 60 mol % of a (meth)acrylamide group-containing compound (a), 10 mol % to 50 mol % of one or more unsaturated acids selected from the group consisting of unsaturated carboxylic acids and unsaturated sulfonic acids or an inorganic salt thereof (b), and 15 mol % to 78 mol % of hydroxyalkyl(meth)acrylate (c) having a hydroxyalkyl group having 2 to 4 carbon atoms.

10 Claims, 1 Drawing Sheet

(51) Int. Cl.
*H01M 4/139* (2010.01)
*H01M 10/0525* (2010.01)
*H01M 10/0585* (2010.01)
*C08F 220/06* (2006.01)
*C08F 220/56* (2006.01)
*C08F 220/28* (2006.01)
*H01M 4/02* (2006.01)

(52) U.S. Cl.
CPC ......... *C08F 220/56* (2013.01); *H01M 4/0404* (2013.01); *H01M 4/0471* (2013.01); *H01M 4/139* (2013.01); *H01M 10/0525* (2013.01); *H01M 10/0585* (2013.01); *H01M 2004/027* (2013.01)

(56) References Cited

U.S. PATENT DOCUMENTS

| | | | |
|---|---|---|---|
| 2004/0101757 | A1 | 5/2004 | Kii et al. |
| 2012/0064407 | A1 | 3/2012 | Muthu et al. |
| 2016/0304646 | A1* | 10/2016 | Hsu ................ C08F 220/20 |
| 2017/0040612 | A1 | 2/2017 | Komaba et al. |
| 2017/0062828 | A1 | 3/2017 | Sonobe et al. |
| 2018/0261815 | A1 | 9/2018 | Ikemi et al. |
| 2020/0395615 | A1* | 12/2020 | Goda ................ C08F 220/56 |
| 2021/0057748 | A1* | 2/2021 | Ozaki ................ C08F 220/585 |

FOREIGN PATENT DOCUMENTS

| | | | |
|---|---|---|---|
| EP | 3823084 | | 5/2021 |
| JP | 2004185810 | | 7/2004 |
| JP | 2005259697 | | 9/2005 |
| JP | 2007227310 | | 9/2007 |
| JP | 2012151108 | | 8/2012 |
| JP | 2012190552 | | 10/2012 |
| JP | 2013089437 | | 5/2013 |
| JP | 2013168323 | A * | 8/2013 |
| JP | 5390336 | | 1/2014 |
| JP | 2014063676 | | 4/2014 |
| JP | 2015023015 | | 2/2015 |
| JP | 2015106488 | | 6/2015 |
| JP | 2015118908 | | 6/2015 |
| JP | 5903761 | | 4/2016 |
| JP | 2018063799 | | 4/2018 |
| JP | 2019057488 | | 4/2019 |
| JP | WO2018008555 | | 4/2019 |
| JP | 2020017504 | | 1/2020 |
| JP | 2020077619 | | 5/2020 |
| WO | WO8200147 | A1 * | 1/1982 |
| WO | WO-2015024865 | A1 * | 2/2015 ........... C08K 5/3435 |
| WO | 2015098507 | | 7/2015 |
| WO | 2017175838 | | 10/2017 |
| WO | 2019013102 | | 1/2019 |
| WO | 2019065471 | | 4/2019 |

OTHER PUBLICATIONS

Office Action of European Counterpart Application, dated Jan. 5, 2022, pp. 1-5.
"Office Action of Europe Counterpart Application", dated Jul. 1, 2021, p. 1-p. 14.
"Office Action of Europe Counterpart Application", dated Jun. 28, 2022, p. 1-p. 8.
"Search Report of Europe Counterpart Application", dated Nov. 30, 2020, p. 1-p. 12.
"Office Action of Japan Counterpart Application", dated Oct. 4, 2022, with English translation thereof, pp. 1-8.
"Decision of Refusal of Japan Counterpart Application", dated Oct. 18, 2022, with English translation thereof, pp. 1-10.

* cited by examiner

THERMALLY CROSSLINKABLE BINDER AQUEOUS SOLUTION FOR LITHIUM-ION BATTERY, THERMALLY CROSSLINKABLE SLURRY FOR LITHIUM-ION BATTERY NEGATIVE ELECTRODE, NEGATIVE ELECTRODE FOR LITHIUM-ION BATTERY, LITHIUM-ION BATTERY NEGATIVE ELECTRODE MATERIAL, AND LITHIUM-ION BATTERY AND METHOD FOR PRODUCING THE SAME

CROSS-REFERENCE TO RELATED APPLICATION

This application claims the priority benefit of Japanese Application Serial No. 2019-111646, filed on Jun. 17, 2019, and Japanese Application Serial No. 2019-111648, filed on Jun. 17, 2019. The entirety of each of the above-mentioned patent applications is hereby incorporated by reference herein and made a part of this specification.

BACKGROUND

Technical Field

The present disclosure relates to a thermally crosslinkable binder aqueous solution for a lithium-ion battery, a thermally crosslinkable slurry for a lithium-ion battery negative electrode, a negative electrode for a lithium-ion battery, a lithium-ion battery negative electrode material, as well as a lithium-ion battery and a method for producing the same.

Related Art

Lithium-ion batteries have a small size, light weight and high energy density, and further, are repeatedly chargeable and dischargeable, and are used in a wide range of applications. Hence, in recent years, improvements to battery members such as electrodes or the like have been studied with the aim of improving the performance of lithium-ion batteries.

The positive electrode and negative electrode of a lithium-ion battery are both produced in the following manner. A slurry prepared by dispersing an electrode active material and a binder resin in a solvent is applied on both sides of a current collector (for example, a metal foil), and after the solvent is dried and removed to form an electrode layer, the resultant is compression-molded by a roll press machine or the like.

A slurry for a lithium-ion battery mainly contains an active material, a binder and a solvent. Examples of the binder that has been generally used so far include polyvinylidene fluoride (PVDF) as a binder resin to be dissolved in an organic solvent such as N-methyl-2-pyrrolidone (NMP) or the like, and a styrene-butadiene emulsion (SBR latex) as a binder resin for a particulate resin of a water dispersion.

In recent years, in an electrode for a lithium-ion battery, various electrode active materials have been proposed from the viewpoint of increasing battery capacity. However, depending on the electrode active material, the electrode for a lithium-ion battery is likely to expand and contract with charging and discharging. Hence, the electrode for a lithium-ion battery that is likely to expand and contract with charging and discharging undergoes a volume change (springback) from the initial stage of repetition of charging and discharging, and a lithium-ion battery using the above electrode is likely to deteriorate in electrical characteristics such as cycle characteristics or the like.

Therefore, in this field, studies have been made to solve the above problem by binder resins. For example, it has been proposed that good charge and discharge characteristics can be obtained by using polyacrylamide (Patent Documents 1 and 2) as a binder of a water-soluble resin. In addition, with respect to expansion and contraction of an active material associated with charging and discharging, it has been proposed to suppress the expansion by adding a crosslinker to a particulate resin being a binder resin (Patent Document 3). The crosslinker usually causes a crosslinking reaction in the drying step after the slurry composition is applied to the current collector, and forms crosslinks between particles of the particulate resin or the like.

In addition, various methods have been proposed as a method for producing a lithium-ion battery (Patent Documents 4 to 5).

PRIOR-ART DOCUMENTS

Patent Documents

[Patent Document 1] Japanese Patent Laid-open No. 2015-118908
[Patent Document 2] Japanese Patent Laid-open No. 2015-106488
[Patent Document 3] WO 2015/098507
[Patent Document 4] Japanese Patent Laid-open No. 2012-190552
[Patent Document 5] Japanese Patent Laid-open No. 2007-227310

From the viewpoint of ensuring solubility in water, the polyacrylamide of Patent Documents 1 and 2 cannot have such a high molecular weight that the binder resin does not dissolve in water. As a result, the resistance to springback arising from expansion of the active material becomes insufficient.

Regarding the use in combination with the crosslinker as described in Patent Document 3, in some cases, even if a large amount of the crosslinker is added, its effect may not be exhibited. In such cases, when a large amount of the crosslinker is added in order to exhibit the effect of the crosslinker, for example, the springback resistance, adhesion of the electrode active material layer to the current collector may instead deteriorate, and desired effects such as high temperature cycle characteristics may not be obtained.

Furthermore, a binder composition containing the crosslinker and a particulate binder may deteriorate during a storage period after preparation and before use, and may not exhibit desired performance.

In addition, in the negative electrode of the lithium-ion battery, not only the springback is desired to be suppressed. Tackiness suppressibility, crack suppressibility and peeling suppressibility are imparted, and it is desirable that edge chipping during electrode production be suppressed.

Patent Documents 4 and 5 have no mention of tackiness suppressibility, crack suppressibility, peeling suppressibility, and edge chipping during electrode production.

SUMMARY

A first aspect of the present disclosure is a thermally crosslinkable binder aqueous solution for a lithium-ion battery, containing a water-soluble poly(meth)acrylamide (A) and having a pH of 5 to 7, wherein the water-soluble poly(meth)acrylamide (A) is a polymer of a monomer group containing, with respect to 100 mol % of the monomer group, 2 mol % to 60 mol % of a (meth)acrylamide group-containing compound (a), 10 mol % to 50 mol % of one or more unsaturated acids selected from the group consisting of unsaturated carboxylic acids and unsaturated sulfonic acids or an inorganic salt thereof (b), and 15 mol % to 78 mol % of hydroxyalkyl(meth)acrylate (c) having a hydroxyalkyl group having 2 to 4 carbon atoms.

A second aspect of the present disclosure is lithium-ion battery negative electrode material, obtained by applying a thermally crosslinkable slurry for a lithium-ion battery negative electrode to a current collector and drying the same, wherein the thermally crosslinkable slurry for a lithium-ion battery negative electrode contains a water-soluble poly(meth)acrylamide (A), water and a negative electrode active material, wherein the water-soluble poly(meth)acrylamide (A) is a polymer of a monomer group containing, with respect to 100 mol % of the monomer group, 2 mol % to 60 mol % of a (meth)acrylamide group-containing compound (a), 10 mol % to 50 mol % of one or more unsaturated acids selected from the group consisting of unsaturated carboxylic acids and unsaturated sulfonic acids or an inorganic salt thereof (b), and 15 mol % to 78 mol % of hydroxyalkyl(meth)acrylate (c) having a hydroxyalkyl group having 2 to 4 carbon atoms, wherein a negative electrode active material layer including a dried product of the thermally crosslinkable slurry for a lithium-ion battery negative electrode has a water concentration of 0.3% to 1.0%, and the water-soluble poly(meth)acrylamide (A) after drying is not crosslinked.

BRIEF DESCRIPTION OF THE DRAWINGS

FIG. 1 shows that a negative electrode active material layer (C) is present on a surface of a current collector (D), wherein the negative electrode active material layer (C) includes a dried product of a thermally crosslinkable slurry for a lithium-ion battery negative electrode, wherein the thermally crosslinkable slurry for a lithium-ion battery negative electrode contains a water-soluble poly(meth)acrylamide (A), a negative electrode active material (B) and water. However, the present invention is not intended to be limited to this drawing.

DETAILED DESCRIPTION

Figure 1:
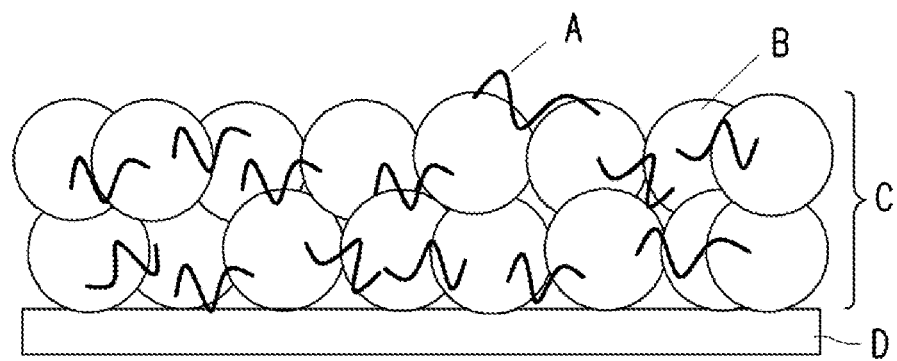
FIG. 1 illustrates an example of a lithium-ion battery negative electrode material according to the present invention. That is.

Therefore, according to an aspect of the invention, there is provided a thermally crosslinkable binder aqueous solution for a lithium-ion battery, which has good storage stability, and a thermally crosslinkable slurry for a lithium-ion battery negative electrode, which has good dispersibility, wherein the thermally crosslinkable binder aqueous solution and the thermally crosslinkable slurry impart good initial Coulombic efficiency and springback resistance to a lithium-ion battery and impart good electrode flexibility to an electrode.

In addition, according to another aspect of the invention, there is provided a lithium-ion battery negative electrode material, capable of imparting good tackiness suppressibility, crack suppressibility and peeling suppressibility to a lithium-ion battery negative electrode, suppressing edge chipping during electrode production, and imparting good springback resistance, capacity retention rate and volume expansion rate to a lithium-ion battery, and a method for producing a lithium-ion battery that uses such a lithium-ion battery negative electrode material.

As a result of earnest studies by the present inventors, the present invention has been completed by using a binder aqueous solution that contains poly(meth)acrylamide having a predetermined unsaturated monomer as a component and that has a predetermined pH.

As a further result of earnest studies by the present inventors, the present invention has been completed by using a predetermined lithium-ion battery negative electrode material and by crosslinking in a drying step during battery production instead of in a drying step during electrode production.

The thermally crosslinkable binder aqueous solution for a lithium-ion battery of the present invention has excellent storage stability. In addition, the thermally crosslinkable slurry for a lithium-ion battery negative electrode of the present invention has excellent dispersibility. Further, the electrode of the present invention has excellent flexibility. The battery of the present invention has excellent initial Coulombic efficiency and springback resistance.

The lithium-ion battery negative electrode material of the present invention is capable of imparting good tackiness suppressibility, crack suppressibility and peeling suppressibility to a lithium-ion battery negative electrode, suppressing edge chipping during electrode production, and imparting good springback resistance, capacity retention rate and volume expansion rate to a lithium-ion battery.

Throughout the present disclosure, ranges of numerical values such as physical property values, content and so on may be suitably set (for example, selected from the upper and lower limit values described in each item below). Specifically, regarding a numerical value α, when the upper limit and lower limit of the numerical value α are, for example, A4, A3, A2, A1 (wherein A4>A3>A2>A1) and so on, the numerical value α is in a range of, for example, A4 or less, A3 or less, A2 or less, A1 or more, A2 or more, A3 or more, A1 to A2, A1 to A3, A1 to A4, A2 to A3, A2 to A4, A3 to A4, and so on.

[Thermally Crosslinkable Binder Aqueous Solution for Lithium-Ion Battery: Also Referred to as Aqueous Solution]

The present disclosure provides a thermally crosslinkable binder aqueous solution for a lithium-ion battery, containing a water-soluble poly(meth)acrylamide (A) (also referred to as component (A)) and having a pH of 5 to 7, wherein the water-soluble poly(meth)acrylamide (A) is a polymer of a monomer group containing, with respect to 100 mol % of the monomer group, 2 mol % to 60 mol % of a (meth)acrylamide group-containing compound (a), 10 mol % to 50 mol % of one or more unsaturated acids selected from the group consisting of unsaturated carboxylic acids and unsaturated sulfonic acids or an inorganic salt thereof (b), and 15 mol % to 78 mol % of hydroxyalkyl(meth)acrylate (c) having a hydroxyalkyl group having 2 to 4 carbon atoms.

The upper limit and lower limit of the pH of the thermally crosslinkable binder aqueous solution for a lithium-ion battery are, for example, 7, 6.9, 6.5, 6, 5.9, 5.6, 5.5, 5.4, 5.2, 5.1, 5, and so on. In one embodiment, the pH of the thermally crosslinkable binder aqueous solution for a lithium-ion battery is preferably 5 to 7 and more preferably 5 or higher and lower than 7 from the viewpoint of solution stability. From the viewpoint of preventing deterioration of dispersibility of slurry and Coulombic efficiency, the pH is preferably 5 or higher; from the viewpoint of preventing deterioration of flexibility, the pH is preferably 7 or lower.

The pH may be measured at 25° C. using a glass electrode pH meter (for example, "pH Meter D-52" (product name) made by Horiba, Ltd.).

In the present disclosure, "water-soluble" means having an insoluble content of less than 0.5% by mass (less than 2.5 mg) when 0.5 g of a compound thereof is dissolved in 100 g of water at 25° C.

In the present disclosure, "(meth)acryl" means "at least one selected from the group consisting of acryl and methacryl." Similarly, "(meth)acrylate" means "at least one selected from the group consisting of acrylate and methacrylate." "(Meth)acryloyl" means "at least one selected from the group consisting of acryloyl and methacryloyl."

<(Meth)Acrylamide Group-Containing Compound (a): Also Referred to as Component (a)>

In the present disclosure, "(meth)acrylamide group-containing compound" means a compound having a (meth) acrylamide group. The (meth)acrylamide group-containing compound may be used singly or in combination of two or more kinds thereof.

In one embodiment, the (meth)acrylamide group-containing compound is expressed by the following structural formula:

[Chemical Formula 1]

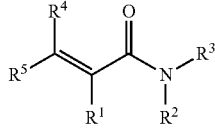

(In the formula, $R^1$ is a hydrogen atom or a methyl group; $R^2$ and $R^3$ are each independently a hydrogen atom, a substituted or unsubstituted alkyl group, or an acetyl group, or a group in which $R^2$ and $R^3$ form a ring structure together; $R^4$ and $R^5$ are each independently a hydrogen atom, a substituted or unsubstituted alkyl group, a hydroxy group, an amino group (—$NR^a R^b$ (wherein $R^a$ and $R^b$ are each independently a hydrogen atom or a substituted or unsubstituted alkyl group), or an acetyl group. Examples of a substituent of the substituted alkyl group include hydroxy group, amino group, acetyl group, and so on. In addition, examples of the group in which $R^2$ and $R^3$ form a ring structure together include morpholyl group, and so on.)

Examples of the alkyl group include linear alkyl group, branched alkyl group, cycloalkyl group, and so on.

The linear alkyl group is expressed by a general formula of —$C_n H_{2n+1}$ (wherein n is an integer of 1 or more). Examples of the linear alkyl group include methyl group, ethyl group, propyl group, n-butyl group, n-pentyl group, n-hexyl group, n-heptyl group, n-octyl group, n-nonyl group, n-decamethyl group, and so on.

The branched alkyl group is a group in which at least one hydrogen of a linear alkyl group is replaced by an alkyl group. Examples of the branched alkyl group include i-propyl group, i-butyl group, s-butyl group, t-butyl group, diethylpentyl group, trimethylbutyl group, trimethylpentyl group, trimethylhexyl group, and so on.

Examples of the cycloalkyl group include monocyclic cycloalkyl group, crosslinked cyclic cycloalkyl group, condensed cyclic cycloalkyl group, and so on.

In the present disclosure, "monocyclic" means a cyclic structure formed by covalent bonding of carbons and having no crosslinking structure therein. "Condensed cyclic" means a cyclic structure in which two or more single rings share two atoms (that is, only one side of each ring is shared (condensed) with each other). "Crosslinked cyclic" means a cyclic structure in which two or more single rings share three or more atoms.

Examples of the monocyclic cycloalkyl group include cyclopentyl group, cyclohexyl group, cycloheptyl group, cyclodecyl group, 3,5,5-trimethylcyclohexyl group, and so on.

Examples of the crosslinked cyclic cycloalkyl group include tricyclodecyl group, adamantyl group, norbornyl group, and so on.

Examples of the condensed cyclic cycloalkyl group include bicyclodecyl group, and so on.

Examples of the above (meth)acrylamide group-containing compound (a) include (meth)acrylamide, N-isopropyl (meth)acrylamide, N,N-dimethyl(meth)acrylamide, N,N-diethyl(meth)acrylamide, N,N-dimethylaminopropyl(meth) acrylamide, N-methylol(meth)acrylamide, diacetone(meth) acrylamide, maleic acid amide, (meth)acryloylmorpholine, hydroxyethyl(meth)acrylamide, and a salt thereof, and so on. Examples of the above salt include dimethylaminopropyl(meth)acrylamide methyl chloride quaternary salt, dimethylaminoethyl (meth)acrylate benzyl chloride quaternary salt, and so on. Among them, when (meth)acrylamide especially acrylamide is used, a binder can be prepared which not only reduces water absorption while maintaining water solubility, but also reduces irreversible capacity, has a high interaction with an electrode active material, and improves the dispersibility of slurry or the binding property between electrode active materials inside an electrode.

The upper limit and lower limit of the content of the (meth)acrylamide group-containing compound with respect to 100 mol % of the monomer group are, for example, 60 mol %, 59 mol %, 55 mol %, 50 mol %, 45 mol %, 40 mol %, 35 mol %, 30 mol %, 25 mol %, 20 mol %, 15 mol %, 10 mol %, 9 mol %, 5 mol %, 3 mol %, 2 mol %, and so on. In one embodiment, the above content is preferably 2 mol % to 60 mol %.

The upper limit and lower limit of the content of the (meth)acrylamide group-containing compound with respect to 100% by mass of the monomer group are, for example, 50% by mass, 45% by mass, 40% by mass, 35% by mass, 30% by mass, 25% by mass, 20% by mass, 15% by mass, 10% by mass, 9% by mass, 5% by mass, 4% by mass, 2% by mass, 1% by mass, and so on. In one embodiment, the above content is preferably 1% by mass to 50% by mass.

<One or More Unsaturated Acids Selected from the Group Consisting of Unsaturated Carboxylic Acids and Unsaturated Sulfonic Acids or Inorganic Salt Thereof (b): Also Referred to as Component (b)>

As the component (b), various known ones may be used without particular limitation, and may be used singly or in combination of two or more thereof.

Examples of the unsaturated carboxylic acid include (meth)acrylic acid, crotonic acid, maleic acid, fumaric acid, itaconic acid, and so on.

Examples of the unsaturated sulfonic acid include: α,β-ethylenically unsaturated sulfonic acid, such as vinylsulfonic acid, styrenesulfonic acid, (meth)allylsulfonic acid; (meth)acrylamide t-butylsulfonic acid, 2-(meth)acrylamide-2-methylpropanesulfonic acid, 2-(meth)acrylamide-2-hydroxypropanesulfonic acid, 3-sulfopropane(meth)acrylic ester, bis-(3-sulfopropyl)itaconic ester, and so on.

In the present disclosure, a compound corresponding to both component (a) and component (b) is regarded as component (b).

Examples of the inorganic salt include alkali metal salt, alkaline earth metal salt, and so on. In the present disclosure, an inorganic salt of an organic substance (for example, an inorganic salt of one or more unsaturated acids selected from the group consisting of unsaturated carboxylic acids and unsaturated sulfonic acids, or an inorganic salt of the component (A) and so on) is referred to as a salt which has a metal cation as cation part.

Examples of the alkali metal include lithium, sodium, potassium, and so on.

Examples of the alkaline earth metal include magnesium, calcium, and so on.

The upper limit and lower limit of the content of the one or more unsaturated acids selected from the group consisting of unsaturated carboxylic acids and unsaturated sulfonic acids or an inorganic salt thereof (b) with respect to 100% by mol of the monomer group are, for example, for example, 50 mol %, 45 mol %, 40 mol %, 35 mol %, 30 mol %, 25 mol %, 20 mol %, 15 mol %, 10 mol %, and so on. In one embodiment, the above content is preferably 10 mol % to 50 mol %, more preferably 20 mol % to 50 mol %.

The upper limit and lower limit of the content of the one or more unsaturated acids selected from the group consisting of unsaturated carboxylic acids and unsaturated sulfonic acids or an inorganic salt thereof (b) with respect to 100% by mass of the monomer group are, for example, for example, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, and so on. In one embodiment, the above content is preferably 10% by mass to 70% by mass, more preferably 20% by mass to 70% by mass.

<Hydroxyalkyl(Meth)Acrylate (c) Having Hydroxyalkyl Group Having 2 to 4 Carbon Atoms: Also Referred to as Component (c)>

As the component (c), various known ones may be used without particular limitation, and may be used singly or in combination of two or more thereof.

In the present disclosure, "hydroxyalkyl group having 2 to 4 carbon atoms" refers to a group in which one of hydrogen atoms constituting an alkyl group having 2 to 4 carbon atoms is replaced by a hydroxy group.

Examples of the hydroxyalkyl(meth)acrylate having a hydroxyalkyl group having 2 to 4 carbon atoms include 1-hydroxyethyl(meth)acrylate, 2-hydroxyethyl(meth)acrylate, 1-hydroxypropyl(meth)acrylate, 2-hydroxypropyl(meth)acrylate, 3-hydroxypropyl(meth)acrylate, 2-hydroxy-1-methylethyl(meth)acrylate, 1-hydroxy-2-methylethyl(meth)acrylate, 1-hydroxybutyl(meth)acrylate, 2-hydroxybutyl(meth)acrylate, 3-hydroxybutyl(meth)acrylate, 4-hydroxybutyl(meth)acrylate, 1-hydroxy-1-methyl-propyl(meth)acrylate, 2-hydroxy-1-methyl-propyl(meth)acrylate, 3-hydroxy-1-methyl-propyl(meth) acrylate, 1-ethyl-2-hydroxyethyl(meth)acrylate, 1-hydroxy-2-methyl-propyl(meth)acrylate, 2-hydroxy-2-methyl-propyl (meth)acrylate, 3-hydroxy-2-methyl-propyl(meth)acrylate, 1,1-dimethyl-2-hydroxyethyl(meth)acrylate, and so on.

The upper limit and lower limit of the content of the hydroxyalkyl(meth)acrylate (c) having a hydroxyalkyl group having 2 to 4 carbon atoms with respect to 100 mol % of the monomer group are, for example, 78 mol %, 75 mol %, 70 mol %, 65 mol %, 60 mol %, 55 mol %, 50 mol %, 45 mol %, 40 mol %, 35 mol %, 30 mol %, 25 mol %, 20 mol %, 17 mol %, 15 mol %, and so on. In one embodiment, the above content is preferably 15 mol % to 78 mol %.

The upper limit and lower limit of the content of the hydroxyalkyl(meth)acrylate (c) having a hydroxyalkyl group having 2 to 4 carbon atoms with respect to 100% by mass of the monomer group are, for example, 80% by mass, 75% by mass, 70% by mass, 65% by mass, 60% by mass, 55% by mass, 50% by mass, 45% by mass, 40% by mass, 35% by mass, 30% by mass, 25% by mass, 20% by mass, and so on. In one embodiment, the above content is preferably 20% by mass to 80% by mass.

The upper limit and lower limit of a ratio of amount of substance [amount of substance of component (a)/amount of substance of component (b)] between the component (a) and the component (b) contained in the monomer group are, for example, 6, 5.5, 5, 4.5, 4, 3.5, 3, 2.5, 2, 1.5, 1, 0.9, 0.5, 0.2, 0.1, 0.09, 0.05, 0.04, and so on. In one embodiment, the above ratio of amount of substance is preferably 0.04 to 6, more preferably 0.04 to 3.

The upper limit and lower limit of a ratio of amount of substance [amount of substance of component (a)/amount of substance of component (c)] between the component (a) and the component (c) contained in the monomer group are, for example, 4, 3, 2.5, 2, 1.5, 1, 0.9, 0.5, 0.2, 0.1, 0.09, 0.05, 0.04, 0.02, and so on. In one embodiment, the above ratio of amount of substance is preferably 0.02 to 4.

The upper limit and lower limit of a ratio of amount of substance [amount of substance of component (b)/amount of substance of component (c)] between the component (b) and the component (c) contained in the monomer group are, for example, 3.5, 3, 2.5, 2, 1.5, 1, 0.9, 0.5, 0.25, 0.12, and so on. In one embodiment, the above ratio of amount of substance is preferably 0.12 to 3.5, more preferably 0.25 to 3.5.

The upper limit and lower limit of a mass ratio [mass of component (a)/mass of component (b)] between the component (a) and the component (b) contained in the monomer group are, for example, 5, 4.5, 4, 3.5, 3, 2.5, 2, 1.5, 1, 0.9, 0.5, 0.25, 0.1, 0.09, 0.05, 0.01, and so on. In one embodiment, the above mass ratio is preferably 0.01 to 5, more preferably 0.01 to 2.5.

The upper limit and lower limit of a mass ratio [mass of component (a)/mass of component (c)] between the component (a) and the component (c) contained in the monomer group are, for example, 2.5, 2, 1.5, 1, 0.9, 0.5, 0.25, 0.1, 0.09, 0.05, 0.01, and so on. In one embodiment, the above mass ratio is preferably 0.01 to 2.5.

The upper limit and lower limit of a mass ratio [mass of component (b)/mass of component (c)] between the component (b) and the component (c) contained in the monomer group are, for example, 3.5, 3, 2.5, 2, 1.5, 1, 0.9, 0.5, 0.25, 0.125, and so on. In one embodiment, the above mass ratio is preferably 0.125 to 3.5, more preferably 0.25 to 3.5.

<Monomer Other than Component (a), Component (b) and Component (b): Also Referred to as Component (d)>

In the monomer group, a monomer (component (d)) that does not correspond to any of the component (a), the component (b) and the component (c) may be used as long as the desired effects of the present invention are not impaired. The component (d) may be used singly or in combination of two or more kinds thereof. Examples of the component (d) include unsaturated phosphoric acid or a salt thereof, a hydroxyl group-free unsaturated carboxylic ester, an α,β-unsaturated nitrile, a conjugated diene, an aromatic vinyl compound, and so on.

Examples of the unsaturated phosphoric acid include vinylphosphonic acid, vinyl phosphate, bis((meth)acryloxyethyl) phosphate, diphenyl-2-(meth)acryloyloxyethyl phosphate, dibutyl-2-(meth)acryloyloxyethyl phosphate, dioctyl-2-(meth)acryloyloxyethyl phosphate, monomethyl-2-(meth)acryloyloxyethyl phosphate, 3-(meth)acryloxy-2-hydroxypropanephosphoric acid, and so on.

The content of the unsaturated phosphoric acid or a salt thereof is not particularly limited, and is preferably less than 40 mol % (for example, less than 30 mol %, less than 20 mol %, less than 19 mol %, less than 15 mol %, less than 10 mol %, less than 5 mol %, less than 1 mol %, or 0 mol %) with respect to 100 mol % of the monomer group, considering a reaction with the above component (b).

The content of the unsaturated phosphoric acid or a salt thereof with respect to 100% by mass of the monomer group is preferably less than 40% by mass (for example, less than 30% by mass, less than 20% by mass, less than 19% by mass, less than 15% by mass, less than 10% by mass, less than 5% by mass, less than 1% by mass, or 0% by mass).

The hydroxyl group-free unsaturated carboxylic ester is preferably a hydroxyl group-free (meth)acrylic ester. Examples of the hydroxyl group-free (meth)acrylic ester include a hydroxyl group-free linear (meth)acrylic ester, a hydroxyl group-free branched (meth)acrylic ester, a hydroxyl group-free alicyclic (meth)acrylic ester, a hydroxyl group-free substituted (meth)acrylic ester, and so on.

Examples of the hydroxyl group-free linear (meth)acrylic ester include methyl (meth)acrylate, ethyl (meth)acrylate, n-propyl (meth)acrylate, n-butyl (meth)acrylate, n-amyl (meth)acrylate, hexyl (meth)acrylate, n-octyl (meth)acrylate, nonyl (meth)acrylate, decyl (meth)acrylate, and so on.

Examples of the hydroxyl group-free branched (meth)acrylic ester include i-propyl (meth)acrylate, i-butyl (meth)acrylate, i-amyl (meth)acrylate, 2-ethylhexyl (meth)acrylate, and so on.

Examples of the hydroxyl group-free alicyclic (meth)acrylic ester include cyclohexyl (meth)acrylate, and so on.

The content of the hydroxyl group-free unsaturated carboxylic ester is not particularly limited. Nevertheless, by use of the hydroxyl group-free unsaturated carboxylic ester, curling of an electrode due to a lowered glass transition temperature of the water-soluble poly(meth)acrylamide (A) of the present invention can be suppressed. On the other hand, considering the springback resistance of the lithium-ion battery of the present invention, the content of the hydroxyl group-free unsaturated carboxylic ester is preferably less than 40 mol % (for example, less than 30 mol %, less than 20 mol %, less than 19 mol %, less than 15 mol %, less than 10 mol %, less than 5 mol %, less than 1 mol %, or 0 mol %) with respect to 100 mol % of the monomer group.

In one embodiment, the content of the hydroxyl group-free unsaturated carboxylic ester with respect to 100% by mass of the monomer group is preferably less than 40% by mass (for example, less than 30% by mass, less than 20% by mass, less than 19% by mass, less than 15% by mass, less than 10% by mass, less than 5% by mass, less than 1% by mass, or 0% by mass).

The $\alpha,\beta$-unsaturated nitrile can be suitably used for the purpose of imparting flexibility to an electrode of the present invention.

Examples of the $\alpha,\beta$-unsaturated nitrile include (meth)acrylonitrile, $\alpha$-chloro(meth)acrylonitrile, $\alpha$-ethyl(meth)acrylonitrile, vinylidene cyanide, and so on. Among them, (meth)acrylonitrile is preferable, and acrylonitrile is particularly preferable.

The content of the $\alpha,\beta$-unsaturated nitrile is not particularly limited, and is preferably less than 40 mol % (for example, less than 30 mol %, less than 20 mol %, less than 19 mol %, less than 15 mol %, less than 10 mol %, less than 5 mol %, less than 1 mol %, or 0 mol %) with respect to 100 mol % of the monomer group. Since the content is less than 40 mol % with respect to 100 mol % of the monomer group, while the solubility of the water-soluble poly(meth)acrylamide (A) in water is maintained, an electrode layer of the above slurry becomes uniform and is likely to exhibit the aforementioned flexibility.

In one embodiment, the content of the $\alpha,\beta$-unsaturated nitrile with respect to 100% by mass of the monomer group is preferably less than 40% by mass (for example, less than 30% by mass, less than 20% by mass, less than 19% by mass, less than 15% by mass, less than 10% by mass, less than 5% by mass, less than 1% by mass, or 0% by mass).

Examples of the conjugated diene include 1,3-butadiene, 2-methyl-1,3-butadiene, 2,3-dimethyl-1,3-butadiene, 2-chloro-1,3-butadiene, a substituted linear conjugated pentadiene, a substituted and side chain conjugated hexadiene, and so on.

The content of the conjugated diene is not particularly limited, and is preferably less than 10 mol %, more preferably 0 mol %, with respect to 100 mol % of the above monomer group, from the viewpoint of springback resistance of the lithium-ion battery according to the present invention.

In one embodiment, the content of the conjugated diene with respect to 100% by mass of the monomer group is preferably less than 10% by mass, more preferably 0% by mass.

In addition, examples of the aromatic vinyl compound include styrene, $\alpha$-methylstyrene, p-methylstyrene, vinyltoluene, chlorostyrene, divinylbenzene, and so on.

The content of the aromatic vinyl compound is not particularly limited, and is preferably less than 10 mol %, more preferably 0 mol %, with respect to 100 mol % of the monomer group, from the viewpoint of springback resistance of the lithium-ion battery according to the present invention.

In one embodiment, the content of the aromatic vinyl compound with respect to 100% by mass of the monomer group is preferably less than 10% by mass, more preferably 0% by mass.

A ratio of the component (d) other than the above unsaturated phosphoric acid or salt thereof, hydroxyl group-free unsaturated carboxylic ester, $\alpha,\beta$-unsaturated nitrile, conjugated diene and aromatic vinyl compound to the monomer group is less than 10 mol %, less than 5 mol %, less than 1 mol %, less than 0.1 mol %, less than 0.01 mol %, or 0 mol %, with respect to 100 mol % of the monomer group, and is less than 10% by mass, less than 5% by mass, less than 1% by mass, less than 0.5% by mass, less than 0.1% by mass, less than 0.01% by mass, or 0% by mass, with respect to 100% by mass of the monomer group.

<Method for Preparing Thermally Crosslinkable Binder Aqueous Solution for Lithium-Ion Battery>

In one embodiment, the above thermally crosslinkable binder aqueous solution for a lithium-ion battery may be prepared by a preparation method including: a step of polymerizing a monomer group containing, with respect to 100 mol % of the monomer group, 2 mol % to 60 mol % of the (meth)acrylamide group-containing compound (a), 10 mol % to 50 mol % of the one or more unsaturated acids selected from the group consisting of unsaturated carboxylic acids and unsaturated sulfonic acids or an inorganic salt thereof (b), and 15 mol % to 78 mol % of the hydroxyalkyl (meth)acrylate (c) having a hydroxyalkyl group having 2 to 4 carbon atoms and obtaining the water-soluble poly(meth)

acrylamide (A); and a step of adjusting the pH of an aqueous solution containing the water-soluble poly(meth)acrylamide (A) to 5 to 7.

<Method for Preparing Component (A)>

The component (A) may be synthesized by various known polymerization methods, preferably a radical polymerization method. Specifically, it is preferable to add a radical polymerization initiator and, if necessary, a chain transfer agent, to a monomer mixture containing the aforementioned components, and, while stirring the mixture, perform a polymerization reaction at a reaction temperature of 50° C. to 100° C. The reaction time is not particularly limited and is preferably 1 hour to 10 hours.

As the radical polymerization initiator, various known ones may be used without particular limitation. Examples of the radical polymerization initiator include: a persulfate, such as potassium persulfate and ammonium persulfate or the like; a redox polymerization initiator in which the above persulfate and a reductant such as sodium bisulfate or the like are combined; an azo initiator, such as 2,2'-azobis-2-amidinopropane dihydrochloride or the like, and so on. The amount of the radical polymerization initiator used is not particularly limited, and is preferably 0.05% by mass to 5.0% by mass, more preferably 0.1% by mass to 3.0% by mass, with respect to 100% by mass of the monomer group that provides the component (A).

Before the radical polymerization reaction and/or when the obtained component (A) is dissolved in water, for the purpose of improving production stability, the pH of a reaction solution may be adjusted by a general neutralizer such as ammonia or organic amine, potassium hydroxide, sodium hydroxide, lithium hydroxide or the like. In this case, the pH is preferably 2 to 11. For the same purpose, it is also possible to use ethylene diamine tetraacetic acid (EDTA), which is a metal ion sealant, or a salt thereof, or the like.

If the water-soluble poly(meth)acrylamide (A) has an acid group, it can be used by having a neutralization ratio adjusted appropriately (a neutralization ratio of 100% indicating that neutralization is performed by an alkali having the same number of moles as the acid component contained in the water-soluble poly(meth)acrylamide (A); a neutralization ratio of 50% indicating that neutralization is performed by an alkali having half the number of moles of the acid component contained in the water-soluble poly(meth)acrylamide (A)) depending on the use. The neutralization ratio when the electrode active material is dispersed is not particularly limited. In one embodiment, the neutralization ratio is preferably 70% to 95% after formation of a coating layer or the like. 70% or more is preferable from the viewpoint of preventing a decrease in initial capacity, and 95% or less is preferable from the viewpoint of preventing hydrolysis. Examples of a neutralized salt include Li salt, Na salt, K salt, ammonium salt, Mg salt, Ca salt, Zn salt, Al salt, and so on.

In one embodiment, the water-soluble poly(meth)acrylamide (A) is preferably an inorganic salt. Examples of the inorganic salt include those mentioned above.

<Physical Properties of Component (A)>

The upper limit and lower limit of a glass transition temperature of the component (A) are, for example, 160° C., 155° C., 150° C., 145° C., 140° C., 135° C., 130° C., 125° C., 120° C., 115° C., 110° C., 105° C., 100° C., 95° C., 90° C., 85° C., 80° C., 75° C., 70° C., 65° C., 60° C., 55° C., 50° C., 45° C., 40° C., 35° C., 30° C., 25° C., 20° C., 15° C., 10° C., 5° C., 0° C., and so on. In one embodiment, 0° C. or higher is preferable, and 30° C. or higher is more preferable from the viewpoint of mechanical strength and heat resistance.

The glass transition temperature of the component (A) may be adjusted by a combination of monomers. The glass transition temperature of the component (A) can be calculated from glass transition temperatures (Tg) (absolute temperature: K) of homopolymers of the monomers and mass fractions thereof based on the Fox equation shown below.

$$1/Tg=(W_1/Tg_1)+(W_2/Tg_2)+(W_3/Tg_3)+\ldots+(W_n/Tg_n)$$

[In the equation, Tg indicates the glass transition temperature (K) of the polymer to be calculated, $W_1$ to $W_n$ each indicate a mass fraction of each monomer, and $Tg_1$ to $Tg_n$ each indicate the glass transition temperature (K) of a homopolymer of each monomer.]

For example, the glass transition temperature is 165° C. in the case of a homopolymer of acrylamide, is 106° C. in the case of a homopolymer of acrylic acid, is −15° C. in the case of a homopolymer of hydroxyethyl acrylate, and is 105° C. in the case of a homopolymer of acrylonitrile. In order to obtain the component (A) having a desired glass transition temperature, the monomer composition constituting the component (A) can be determined. Moreover, the glass transition temperature of a homopolymer of a monomer can be measured by a differential scanning calorimeter (DSC), a differential thermal analyzer (DTA), a thermomechanical measurement apparatus (TMA) or the like under the condition that the temperature is raised from −100° C. to 300° C. (at a temperature rising rate of 10° C./min). Moreover, values described in a literature may also be used. Examples of the literature include page 325 of "Handbook of Chemistry: Pure Chemistry II" (Revised 5th Edition) edited by the Chemical Society of Japan, and so on.

While a gel fraction of a cured product of the water-soluble poly(meth)acrylamide (A) is not particularly limited, the upper limit and lower limit of a gel fraction of the component (A) are, for example, 99.9%, 95%, 90%, 85%, 80%, 75%, 70%, 65%, 60%, 55%, 50%, 45%, 40%, 35%, 30%, 25%, 20%, and so on. In one embodiment, 20% or more is preferable, and 25% or more is more preferable, from the viewpoint of the effect of exhibiting the springback resistance associated with a charge and discharge cycle.

Moreover, the gel fraction of the cured product of the water-soluble poly(meth)acrylamide (A) is a value calculated by the following equation:

Gel fraction (%)={insoluble residue (g) in water/ mass (g) of solid resin}×100

In one embodiment, curing conditions of the above cured product are, for example, 120° C. for 4 hours, and so on.

The above gel fraction is measured as follows, for example. A thermally crosslinkable binder aqueous solution for a lithium-ion battery in an appropriate amount (for example, 10 g), which contains the water-soluble poly(meth)acrylamide (A), is put in an appropriate container (for example, an ointment can (product name "Ointment Can made of tinplate" made by SOGO LABORATORY GLASS WORKS CO., LTD.)), and after drying under appropriate drying conditions (for example, at 120° C. for 4 hours by a circulating air dryer (product name "Blower Constant Temperature Dryer DSR420DA" made by Advantec Toyo Kaisha, Ltd.)), a solid resin after thermal crosslinking is obtained. The mass of the solid resin is accurately measured at 25° C. by an appropriate mass meter (for example, "Standard Balance CPA324S" (product name) made by Sartorius Japan K.K.). The measured solid resin is transferred to an appropriate container (for example, a 300 mL beaker) containing pure water in an appropriate amount (for example, 150 mL), and after immersion in water under appropriate conditions (for example, at 25° C. for 3 hours) under stirring by an appropriate magnetic stirrer (for example, "Powerful Magnetic Stirrer RCX-1000D" (product name) made by Tokyo Rikakikai Co., Ltd.), the resultant is filtered under reduced pressure by an appropriate tool (for example, filter paper ("No. 50B" made by Kiriyama Glass Works Co.), and using a Kiriyama funnel (product name "KIRIYAMA ROHTO SB-60" made by Kiriyama Glass Works Co.) and a suction bell (product name "Suction Bell VKB-200" made by Kiriyama Glass Works Co.)). After that, an insoluble residue remaining on the filter paper is dried under appropriate conditions (for example, at 120° C. for 3 hours) by an appropriate dryer (for example, the above circulating air dryer), followed by an accurate measurement of the mass of the insoluble residue by an appropriate mass meter (for example, the above mass meter) at an appropriate temperature (for example, 25° C.), and a gel fraction of the resin after thermal crosslinking of the water-soluble binder for a battery is calculated from the above equation.

Thermal crosslinking of the water-soluble poly(meth) acrylamide (A) is considered to be caused by an amide group derived from the (meth)acrylamide group-containing compound (a) and a hydroxyl group derived from the the hydroxyalkyl(meth)acrylate (c) having a hydroxyalkyl group having 2 to 4 carbon atoms. A molar ratio (amide group/hydroxyl group) between the amide group and the hydroxyl group in the water-soluble poly(meth)acrylamide (A) is not particularly limited, and the amide group is preferably in excess. The upper limit and lower limit of the molar ratio (amide group/hydroxyl group) between the amide group and the hydroxyl group are, for example, 19, 18, 17.5, 15, 12.5, 10, 9, 7.5, 5, 2.5, 1.2, 1.0, and so on. In one embodiment, the amide group to hydroxyl group molar ratio is preferably 1.0 to 19.0, more preferably 1.2 to 18.0. It is conceivable that the effect of exhibiting the springback resistance associated with a charge and discharge cycle can be achieved by satisfying the above without losing the adhesion of the active material layer to the current collector. However, the present invention is not intended to be limited thereto.

A weight average molecular weight (Mw) of the component (A) is not particularly limited, and its upper limit and lower limit are, for example, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 350,000, 300,000, and so on. In one embodiment, from the viewpoint of dispersion stability of the above slurry, 300,000 to 6,000,000 is preferable, and 350,000 to 6,000,000 is more preferable.

A number average molecular weight (Mn) of the component (A) is not particularly limited, and its upper limit and lower limit are, for example, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 300,000, 200,000, 100,000, 50,000, 10,000, and so on. In one embodiment, the number average molecular weight (Mn) of the component (A) is preferably 10,000 or more.

The weight average molecular weight and the number average molecular weight may be calculated, for example, as values in terms of polyacrylic acid as measured by gel permeation chromatography (GPC) in an appropriate solvent.

The upper limit and lower limit of a molecular weight distribution (Mw/Mn) of the component (A) are, for example, 15, 14, 13, 11, 10, 9, 7.5, 5, 4, 3, 2.9, 2.5, 2, 1.5, 1.1, and so on. In one embodiment, the molecular weight distribution (Mw/Mn) of the component (A) is preferably 1.1 to 15.

B-type viscosity of an aqueous solution containing 13% by mass of the component (A) is not particularly limited, and its upper limit and lower limit are, for example, 100,000 mPa·s, 90,000 mPa·s, 80,000 mPa·s, 70,000 mPa·s, 60,000 mPa·s, 50,000 mPa·s, 40,000 mPa·s, 30,000 mPa·s, 20,000 mPa·s, 10,000 mPa·s, 9,000 mPa·s, 8,000 mPa·s, 7,000 mPa·s, 6,000 mPa·s, 5,000 mPa·s, 4,000 mPa·s, 3,000 mPa·s, 2,000 mPa·s, 1,000 mPa·s, and so on. In one embodiment, the B-type viscosity preferably ranges from 1,000 mPa·s to 100,000 mPa·s.

The B-type viscosity is measured by a B-type viscometer such as "B-type Viscometer Model BM" (product name) made by Toki Sangyo Co., Ltd.

The upper limit and lower limit of the content of the water-soluble poly(meth)acrylamide (A) with respect to 100% by mass of the thermally crosslinkable binder aqueous solution for a lithium-ion battery are, for example, 20% by mass, 19% by mass, 15% by mass, 14% by mass, 12% by mass, 10% by mass, 9% by mass, 7% by mass, 6% by mass, 5% by mass, and so on. In one embodiment, the above content is preferably 5% by mass to 20% by mass.

The upper limit and lower limit of the content of water with respect to 100% by mass of the thermally crosslinkable binder aqueous solution for a lithium-ion battery are, for example, 95% by mass, 90% by mass, 85% by mass, 80% by mass, and so on. In one embodiment, the above content is preferably 80% by mass to 95% by mass.

The upper limit and lower limit of a mass ratio [mass of component (A)/mass of water] between the component (A) and the water contained in the thermally crosslinkable binder aqueous solution for a lithium-ion battery are, for example, 0.25, 0.2, 0.15, 0.1, 0.05, and so on. In one embodiment, the above mass ratio is preferably 0.05 to 0.25.

<Dispersion (Emulsion)>

In one embodiment, the above binder aqueous solution for a lithium-ion battery contains a dispersion (emulsion).

Examples of the dispersion (emulsion) include styrene-butadiene-based copolymer latex, polystyrene-based polymer latex, polybutadiene-based polymer latex, acrylonitrile-butadiene-based copolymer latex, polyurethane-based polymer latex, polymethylmethacrylate-based polymer latex, methylmethacrylate-butadiene-based copolymer latex, polyacrylate-based polymer latex, vinyl chloride-based polymer latex, vinyl acetate-based polymer emulsion, vinyl acetate-ethylene-based copolymer emulsion, polyethylene emulsion, carboxy-modified styrene-butadiene copolymer resin emulsion, acrylic resin emulsion, polyethylene, polypropylene, polyethylene terephthalate, polyamide (PA), polyimide (PI), polyamide-imide (PAT), an aromatic polyamide, alginic acid and a salt thereof, polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene tetrafluoroethylene (ETFE) copolymer, and so on.

The upper limit and lower limit of the content of the dispersion (emulsion) with respect to 100% by mass of the component (A) are, for example, 100% by mass, 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, 20% by mass, 19% by mass, 17% by mass, 15% by mass, 13% by mass, 10% by mass, 9% by mass, 7% by mass, 5% by mass, 4% by mass, 2% by mass, 1% by mass, 0% by mass, and so on. In one embodiment, the above content is preferably 0% by mass to 100% by mass from the viewpoint of springback resistance and discharge capacity retention rate.

<Thickener>

In one embodiment, the above thermally crosslinkable binder aqueous solution for a lithium-ion battery contains a thickener.

Examples of the thickener include: a cellulosic polymer, such as carboxymethyl cellulose, methyl cellulose, hydroxypropyl cellulose or the like, as well as an ammonium salt and an alkali metal salt thereof; (modified) poly(meth)acrylic acid as well as an ammonium salt and an alkali metal salt thereof; polyvinyl alcohols, such as (modified) polyvinyl alcohol, a copolymer of acrylic acid or acrylate and vinyl alcohol, a copolymer of maleic anhydride, maleic acid, or fumaric acid and vinyl alcohol; polyethylene glycol, polyethylene oxide, polyvinylpyrrolidone, modified polyacrylic acid, oxidized acid starch, phosphoric acid starch, casein, various modified starches, an acrylonitrile-butadiene copolymer hydride, and so on.

The upper limit and lower limit of the content of the thickener with respect to 100% by mass of the component (A) are, for example, 50% by mass, 45% by mass, 40% by mass, 35% by mass, 30% by mass, 25% by mass, 20% by mass, 19% by mass, 17% by mass, 15% by mass, 13% by mass, 10% by mass, 9% by mass, 7% by mass, 5% by mass, 4% by mass, 2% by mass, 1% by mass, 0% by mass, and so on. In one embodiment, the above content is preferably 0% by mass to 50% by mass.

<Additive>

The thermally crosslinkable binder aqueous solution for a lithium-ion battery may contain, as an additive, an agent that does not correspond to any of the component (A), water, the dispersion (emulsion) and the thickener. Examples of the additive include a dispersant, a leveling agent, an antioxidant, a crosslinker, a hydroxysilyl compound, and so on. The content of the additive is, for example, 0% by mass to 5% by mass, less than 1% by mass, less than 0.1% by mass, less than 0.01% by mass, or the like, with respect to 100% by mass of the component (A), and is, for example, 0% by mass to 5% by mass, less than 1% by mass, less than 0.1% by mass, less than 0.01% by mass, 0% by mass, or the like, with respect to 100% by mass of the aqueous solution.

Examples of the dispersant include an anionic dispersant, a cationic dispersant, a nonionic dispersant, a polymer dispersant, and so on.

Examples of the leveling agent include a surfactant, such as an alkyl-based surfactant, a silicon-based surfactant, a fluorine-based surfactant, a metal-based surfactant or the like, and so on. By using the surfactant, cissing that occurs during coating may be prevented and smoothness of the above slurry layer (coating layer) may be improved.

Examples of the antioxidant include a phenol compound, a hydroquinone compound, an organophosphorus compound, a sulfur compound, a phenylenediamine compound, a polymer type phenol compound, and so on. The polymer type phenol compound is a polymer having a phenol structure in a molecule. A weight average molecular weight of the polymer type phenol compound is preferably 200 to 1,000, more preferably 600 to 700.

Examples of the crosslinker include formaldehyde, glyoxal, hexamethylenetetramine, urea formaldehyde resin, methylol melamine resin, a carbodiimide compound, a polyfunctional epoxy compound, an oxazoline compound, a polyfunctional hydrazide compound, an isocyanate compound, a melamine compound, an urea compound, and a mixture thereof.

A hydroxysilyl compound means a compound having a structure in which a hydroxy group (—OH) is directly bonded to a silicon atom. A trihydroxysilyl compound means a compound having a trihydroxysilyl group (—Si(OH)$_3$). A tetrahydroxysilyl compound means a compound represented by $Si(OH)_4$. In one embodiment, the trihydroxysilyl compound is a compound represented by the following general formula: $RSi(OH)_3$ (In the formula, R represents substituted or unsubstituted alkyl group, vinyl group, or (meth)acryloxy group, and examples of the above substituent include amino group, mercapto group, glycidoxy group, (meth)acryloxy group, epoxy group, and so on.) The hydroxysilyl compound is preferably prepared by hydrolyzing a silane coupling agent or tetraalkoxysilane. The hydroxysilyl compound may be partially polycondensed without losing water solubility. As the silane coupling agent, a commonly used silane coupling agent may be used. The silane coupling agent is not particularly limited. The hydroxysilyl compound prepared from the silane coupling agent may be used singly or in combination of two or more kinds thereof. In one embodiment, the hydroxysilyl compound contains trihydroxysilylpropylamine. Examples of trialkoxysilanes include 3-aminopropyltrimethoxysilane, 3-aminopropyltriethoxysilane, N-2-(aminoethyl)3-aminopropyltrimethoxysilane, N-2-(aminoethyl)3-aminopropyltriethoxysilane, 3-triethoxysilyl-N-(1,3-dimethyl-butylidene)propylamine, N-phenyl-3-aminopropyltrimethoxysilane, 3-mercaptopropyltrimethoxysilane, 3-isocyanatepropyltriethoxysilane, vinyltrimethoxysilane, vinyltriethoxysilane, 3-methacryloxypropyltrimethoxysilane, 3-methacryloxypropyltriethoxysilane, 3-acryloxypropyltrimethoxysilane, tetrahydroxysilane, and so on. Examples of the tetraalkoxysilane include tetramethoxysilane, a tetramethoxysilane oligomer, tetraethoxysilane, a tetraethoxysilane oligomer, and so on. Among them, the hydroxysilyl compound is preferably prepared using 3-aminopropyltrimethoxysilane from the viewpoint of stability and resistance to electrolytic solution.

Examples of the additive other than those mentioned above include at least one compound selected from the group consisting of unsaturated carboxylic acids, unsaturated amides, and salts thereof.

The above thermally crosslinkable binder aqueous solution for a lithium-ion battery may be used as a thermally crosslinkable binder aqueous solution for a lithium-ion battery negative electrode.

[Thermally Crosslinkable Slurry for Lithium-Ion Battery Negative Electrode: Also Referred to as Slurry]

The present disclosure provides a thermally crosslinkable slurry for a lithium-ion battery negative electrode, containing the above thermally crosslinkable binder aqueous solution for a lithium-ion battery and a negative electrode active material and having a pH of 5 to 7.

In the present disclosure, "slurry" means a suspension of liquid and solid particles.

The upper limit and lower limit of the pH of the thermally crosslinkable slurry for a lithium-ion battery negative electrode are, for example, 7, 6.9, 6.5, 6, 5.9, 5.6, 5.5, 5.4, 5.2, 5.1, 5, and so on. In one embodiment, the pH of the thermally crosslinkable slurry for a lithium-ion battery negative electrode is preferably 5 to 7 and more preferably 5 or higher and lower than 7 from the viewpoint of solution stability. From the viewpoint of preventing deterioration of dispersibility of slurry and Coulombic efficiency, the pH is preferably 5 or higher; from the viewpoint of preventing deterioration of flexibility, the pH is preferably 7 or lower.

<Negative Electrode Active Material>

The negative electrode active material is not particularly limited as long as being capable of reversibly occluding and releasing lithium, and may be used singly or in combination of two or more kinds thereof. As the negative electrode active material, an appropriate material may be suitably selected depending on the type of the target power storage device. Examples of the negative electrode active material include a carbon material, as well as a material alloyable with lithium, such as a silicon material, a lithium atom-containing oxide, a lead compound, a tin compound, an arsenic compound, an antimony compound, an aluminum compound or the like, and so on. Since the carbon material or the material alloyable with lithium has a large volume expansion rate when the battery is charged, the effect of the present invention may be remarkably exhibited.

Examples of the above carbon material include graphite (for example, natural graphite, artificial graphite or the like) which is highly crystalline carbon, low crystalline carbon (such as soft carbon, hard carbon or the like), carbon black (such as Ketjen black, acetylene black, channel black, lamp black, oil furnace black, thermal black or the like), a fullerene, a carbon nanotube, a carbon nanofiber, a carbon nanohorn, a carbon fibril, mesocarbon microbeads (MCMB), a pitch-based carbon fiber, and so on.

Examples of the above silicon material include, in addition to silicon, silicon oxide and silicon alloy, silicon oxide composites expressed by SiC, $SiO_xC_y$ (wherein $0<x\leq3$, and $0<y\leq5$), $Si_3N_4$, $Si_2N_2O$, and $SiO_x$ (wherein $0<x\leq2$) (for example, materials described in Japanese Patent Laid-Open Nos. 2004-185810 and 2005-259697 and so on), a silicon material described in Japanese Patent Laid-Open No. 2004-185810, and so on. In addition, silicon materials described in Japanese Patent Nos. 5390336 and 5903761 may also be used.

The above silicon oxide is preferably a silicon oxide expressed by a composition formula $SiO_x$ (wherein $0<x<2$, preferably $0.1\leq x\leq1$).

The above silicon alloy is preferably an alloy of silicon and at least one transition metal selected from the group consisting of titanium, zirconium, nickel, copper, iron and molybdenum. Silicon alloys of these transition metals are preferable due to high electronic conductivity and high strength. The silicon alloy is more preferably a silicon-nickel alloy or a silicon-titanium alloy, particularly preferably a silicon-titanium alloy. A content ratio of silicon in the silicon alloy is preferably 10 mol % or more, more preferably 20 mol % to 70 mol %, with respect to 100 mol % of metal elements in the above silicon alloy. The silicon material may be single crystalline, polycrystalline, or amorphous.

When the silicon material is used as the negative electrode active material, a negative electrode active material other than the silicon material may be used together. Examples of such a negative electrode active material include the above carbon material; a conductive polymer such as polyacene or the like; a composite metal oxide expressed by $A_xB_yO_z$ (wherein A represents an alkali metal or a transition metal, B represents at least one selected from transition metals such as cobalt, nickel, aluminum, tin, manganese or the like, O represents an oxygen atom, and X, Y, and Z are respectively numbers in the following ranges: $0.05<X<1.10$, $0.85<Y<4.00$ and $1.5<Z<5.00$), or other metal oxide, and so on. When the silicon material is used as the negative electrode active material, it is preferable to use a carbon material together because a volume change associated with the occlusion and release of lithium is small.

Examples of the above lithium atom-containing oxide include a ternary nickel cobalt lithium manganate, and a lithium-transition metal composite oxide, such as a lithium-manganese composite oxide (such as $LiMn_2O_4$ or the like), a lithium-nickel composite oxide (such as $LiNiO_2$ or the like), a lithium-cobalt composite oxide (such as $LiCoO_2$ or the like), a lithium-iron composite oxide (such as $LiFeO_2$ or the like), a lithium-nickel-manganese composite oxide (such as $LiNi_{0.5}Mn_{0.5}O_2$ or the like), a lithium-nickel-cobalt composite oxide (such as $LiNi_{0.8}Co_{0.2}O_2$ or the like), a lithium-transition metal phosphate compound (such as $LiFePO_4$ or the like), a lithium-transition metal sulfate compound (such as $Li_xFe_2(SO_4)_3$), a lithium-titanium composite oxide (such as lithium titanate: $Li_4Ti_5O_{12}$) or the like, other conventionally known negative electrode active material, and so on.

The shape of the negative electrode active material is not particularly limited and may be an arbitrary shape such as a fine particle shape, a thin film shape or the like, and a fine particle shape is preferable. An average particle diameter of the negative electrode active material is not particularly limited, and its upper limit and lower limit are, for example, 50 µm, 45 µm, 40 µm, 35 µm, 30 µm, 25 µm, 20 µm, 15 µm, 10 µm, 5 µm, 4 µm, 3 µm, 2.9 µm, 2 µm, 1 µm, 0.5 µm, 0.1 µm, and so on. In one embodiment, the average particle diameter of the negative electrode active material is preferably 0.1 µm to 50 µm, more preferably 0.1 µm to 45 µm, even more preferably 1 µm to 10 µm, and particularly preferably about 5 µm. Handleability is good if the average particle diameter is 0.1 µm or more, and application of an electrode is easy if the average particle diameter is 50 µm or less. When the average particle diameter is within such a range, a uniform and thin coating film can be formed, which is therefore preferable.

In the present disclosure, "particle diameter" means a maximum distance among distances between arbitrary two points on a contour line of a particle (the same applies hereinafter). In addition, in the present disclosure, unless otherwise specified, "average particle diameter" means a value calculated as an average value of particle diameters of particles observed in several to several tens of visual fields using an observation means such as a scanning electron microscope (SEM) or a transmission electron microscope (TEM) or the like (the same applies hereinafter).

To remarkably exhibit the effect of the present invention, the carbon material and/or the material alloyable with lithium is preferably contained in the negative electrode active material in an amount of 50% by mass or more, more preferably 80% by mass or more, even more preferably 90% by mass or more, and particularly preferably 100% by mass.

In one embodiment, from the viewpoint of increasing the battery capacity of the lithium-ion battery, the content of silicon or silicon oxide covered with a carbon layer in the negative electrode active material is preferably 5% by mass or more (for example, 10% by mass or more, 20% by mass or more, 30% by mass or more, 40% by mass or more, 50% by mass or more, 60% by mass or more, 70% by mass or more, 80% by mass or more, 90% by mass or more, or 100% by mass) with respect to 100% by mass of the electrode active material.

The upper limit and lower limit of the content of the component (A) with respect to 100% by mass of the above slurry are, for example, 15% by mass, 14% by mass, 12% by mass, 10% by mass, 9% by mass, 7% by mass, 5% by mass, 4% by mass, 3% by mass, 2% by mass, 1% by mass, 0.9% by mass, 0.6% by mass, 0.5% by mass, and so on. In one embodiment, the content of the component (A) is preferably 0.5% by mass to 15% by mass with respect to 100% by mass of the slurry of the present invention.

The upper limit and lower limit of the content of the component (A) with respect to 100% by mass of the negative electrode active material in the above slurry are about, for example, 15% by mass, 14% by mass, 11% by mass, 10% by mass, 9% by mass, 5% by mass, 4% by mass, 2% by mass, 1% by mass, and so on. In one embodiment, the content of the component (A) is preferably about 1% by mass to 15% by mass with respect to 100% by mass of the negative electrode active material.

The upper limit and lower limit of the content of the negative electrode active material with respect to 100% by mass of the above slurry are, for example, 65% by mass, 60% by mass, 55% by mass, 50% by mass, 45% by mass, 40% by mass, 35% by mass, 30% by mass, 25% by mass, 20% by mass, and so on. In one embodiment, the content of the negative electrode active material with respect to 100% by mass of the above slurry is preferably 20% by mass to 65% by mass.

The upper limit and lower limit of the content of water with respect to 100% by mass of the above slurry are, for example, 79% by mass, 75% by mass, 70% by mass, 65% by mass, 60% by mass, 55% by mass, 50% by mass, 45% by mass, 40% by mass, 35% by mass, 30% by mass, 25% by mass, 20% by mass, and so on. In one embodiment, the content of water is preferably 20% by mass to 79% by mass with respect to 100% by mass of the above slurry.

A binder other than the water-soluble poly(meth)acrylamide (A) may be used in the above slurry. In one embodiment, the content of the water-soluble poly(meth)acrylamide (A) in all the binders is preferably 90% by mass or more (for example, 95% by mass or more, 99% by mass or more, 100% by mass or the like).

<Slurry Viscosity Adjustment Solvent>

A slurry viscosity adjustment solvent is not particularly limited, and may include a non-aqueous medium having a normal boiling point of 80° C. to 350° C. The slurry viscosity adjustment solvent may be used singly or in combination of two or more kinds thereof. Examples of the slurry viscosity adjustment solvent include: an amide solvent, such as N-methylpyrrolidone, dimethylformamide, N,N-dimethylacetamide or the like; a hydrocarbon solvent, such as toluene, xylene, n-dodecane, tetralin or the like; an alcohol solvent, such as methanol, ethanol, 2-propanol, isopropyl alcohol, 2-ethyl-1-hexanol, 1-nonanol, lauryl alcohol or the like; a ketone solvent, such as acetone, methyl ethyl ketone, cyclohexanone, phorone, acetophenone, isophorone or the like; an ether solvent, such as dioxane, tetrahydrofuran (THF) or the like; an ester solvent, such as benzyl acetate, isopentyl butyrate, methyl lactate, ethyl lactate, butyl lactate or the like; an amine solvent, such as o-toluidine, m-toluidine, p-toluidine or the like; a lactone, such as γ-butyrolactone, δ-butyrolactone or the like; a sulfoxide and sulfone solvent, such as dimethyl sulfoxide, sulfolane or the like; water, and so on. Among them, N-methylpyrrolidone is preferable from the viewpoint of application workability. The content of the above non-aqueous medium is not particularly limited, and is preferably 0% by mass to 10% by mass with respect to 100% by mass of the above slurry.

There has been an attempt to thermally crosslink a binder resin in an electrode by adding a crosslinker to a binder or slurry and coating the slurry on a current collector and drying the same (for example, a material described in WO 2015/098507). Accordingly, by crosslinking the binder resin in the electrode, an effect of suppressing expansion of the active material layer associated with a charge and discharge cycle is achieved. Also, in the thermally crosslinkable binder aqueous solution of the present invention, by thermally crosslinking the binder resin in the electrode, the effect of suppressing expansion of the active material layer associated with a charge and discharge cycle is achieved. The thermally crosslinkable binder aqueous solution of the present invention or a thermally crosslinkable slurry using this thermally crosslinkable binder aqueous solution has excellent storage stability. A method for evaluating storage stability is as follows. The solution viscosity of the prepared thermally crosslinkable binder aqueous solution or thermally crosslinkable slurry is measured by a B-type viscometer, followed by storage in an oven heated to 40° C. for 3 days. Then the solution viscosity after storage is again measured by the B-type viscometer, and whether there is a change in viscosity is confirmed, thereby performing the evaluation.

<Additive>

The above slurry may contain, as an additive, an agent that does not correspond to any of the component (A), the negative electrode active material, water, and the slurry viscosity adjustment solvent. The content of the additive is, for example, 0% by mass to 5% by mass, less than 1% by mass, less than 0.1% by mass, less than 0.01% by mass, 0% by mass, or the like, with respect to 100% by mass of the above slurry. Examples of the additive include those described above.

The above slurry may be prepared by a preparation method including: a step of mixing the water-soluble poly(meth)acrylamide (A) with the negative electrode active material, wherein the water-soluble poly(meth)acrylamide (A) is a polymer of a monomer group containing, with respect to 100 mol % of the monomer group, 2 mol % to 60 mol % of the (meth)acrylamide group-containing compound (a), 10 mol % to 50 mol % of the one or more unsaturated acids selected from the group consisting of unsaturated carboxylic acids and unsaturated sulfonic acids or an inorganic salt thereof (b), and 15 mol % to 78 mol % of the hydroxyalkyl(meth)acrylate (c) having a hydroxyalkyl group having 2 to 4 carbon atoms; and a step of adjusting the pH to 5 to 7.

Examples of the preparation method of the slurry of the present invention include a method for mixing an aqueous solution (the above thermally crosslinkable binder aqueous solution for a lithium-ion battery) of the component (A) with the negative electrode active material, and a method for separately mixing the component (A), the negative electrode active material, and water. The order of mixing in the above method is not particularly limited.

Examples of a means of mixing the slurry include a ball mill, a sand mill, a pigment disperser, a Raikai mixer, an ultrasonic disperser, a homogenizer, a planetary mixer, a Hobart mixer and so on.

[Lithium-Ion Battery Negative Electrode]

The present disclosure provides a negative electrode for a lithium-ion battery, obtained by applying the above thermally crosslinkable slurry for a lithium-ion battery negative electrode to a current collector, and drying and curing the same. The above electrode has a dried and cured product of the above thermally crosslinkable slurry for a lithium-ion battery negative electrode on the current collector.

As the current collector, various known ones may be used without particular limitation. A material of the current collector is not particularly limited, and examples thereof include a metal material, such as copper, iron, aluminum, nickel, stainless steel, nickel-plated steel or the like, or a carbon material, such as carbon cloth, carbon paper or the like. The form of the current collector is not particularly limited. In the case of metal material, examples thereof include a metal foil, a metal cylinder, a metal coil, a metal plate and so on; in the case of carbon material, examples thereof include a carbon plate, a carbon thin film, a carbon cylinder and so on. Among them, when an electrode active material is used in the negative electrode, a copper foil is preferably used as the current collector because it is currently used in industrialized products.

The application means is not particularly limited, and examples thereof include a conventionally known coating device, such as a comma coater, a gravure coater, a micro gravure coater, a die coater, a bar coater and so on.

The drying means is also not particularly limited, and the temperature is preferably about 80° C. to 200° C., more preferably about 90° C. to 180° C. The atmosphere may be dry air or an inert atmosphere. By drying at an appropriate temperature, crosslinking of the water-soluble poly(meth)acrylamide (A) (which is the thermally crosslinkable binder for a lithium-ion battery) progresses, and the springback resistance associated with a charge and discharge cycle is exhibited.

The thickness of the negative electrode (cured product) is not particularly limited, and is preferably 5 μm to 300 μm, more preferably 10 μm to 250 μm. By setting the above range, a function of occluding and releasing sufficient lithium with respect to a high-density current value may be easily obtained.

[Lithium-Ion Battery]

The present disclosure provides a lithium-ion battery including the above negative electrode for a lithium-ion battery. In one embodiment, the above battery includes an electrolyte solution, a separator, a positive electrode and so on. The above are not particularly limited.

Examples of the electrolyte solution include non-aqueous electrolytic solution in which a supporting electrolyte is dissolved in a non-aqueous solvent, and so on. In addition, a film forming agent may be contained in the above non-aqueous electrolytic solution.

As the non-aqueous solvent, various known ones may be used without particular limitation, and may be used singly or in combination of two or more thereof. Examples of the non-aqueous solvent include: a chain carbonate solvent, such as diethyl carbonate, dimethyl carbonate, ethyl methyl carbonate or the like; a cyclic carbonate solvent, such as ethylene carbonate, propylene carbonate, butylene carbonate or the like; a chain ether solvent, such as 1,2-dimethoxyethane or the like; a cyclic ether solvent, such as tetrahydrofuran, 2-methyltetrahydrofuran, sulfolane, 1,3-dioxolane or the like; a chain ester solvent, such as methyl formate, methyl acetate, methyl propionate or the like; a cyclic ester solvent, such as γ-butyrolactone, γ-valerolactone or the like; acetonitrile, and so on. Among them, a combination of mixed solvents containing a cyclic carbonate and a chain carbonate is preferable.

A lithium salt is used as the supporting electrolyte. As the lithium salt, various known ones may be used without particular limitation, and may be used singly or in combination of two or more thereof. Examples of the supporting electrolyte include $LiPF_6$, $LiAsF_6$, $LiBF_4$, $LiSbF6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)NLi$ and so on. Among them, $LiPF_6$, $LiClO_4$ and $CF_3SO_3Li$, which are easily dissolved in a solvent and exhibit a high dissociation degree, are preferable. The higher the dissociation degree of the supporting electrolyte, the higher the lithium-ion conductivity. Therefore, the lithium-ion conductivity can be adjusted according to the type of the supporting electrolyte.

As the film forming agent, various known ones may be used without particular limitation, and may be used singly or in combination of two or more thereof. Examples of the film forming agent include: a carbonate compound, such as vinylene carbonate, vinyl ethylene carbonate, vinyl ethyl carbonate, methylphenyl carbonate, fluoroethylene carbonate, difluoroethylene carbonate or the like; an alkene sulfide, such as ethylene sulfide, propylene sulfide or the like; a sultone compound, such as 1,3-propane sultone, 1,4-butane sultone or the like; an acid anhydride, such as maleic anhydride, succinic anhydride or the like, and so on. The content of the film forming agent in the electrolyte solution is not particularly limited, and is 10% by mass or less, 8% by mass or less, 5% by mass or less, or 2% by mass or less, in order of preference. By setting the content to 10% by mass or less, the advantages of the film forming agent, such as suppression of initial irreversible capacity or improvement in low temperature characteristics and rate characteristics, may be easily achieved.

The separator is an article interposed between a positive electrode and a negative electrode, and is used to prevent a short circuit between the electrodes. Specifically, a porous separator such as a porous film or a nonwoven fabric or the like may be preferably used, which is impregnated with the aforementioned non-aqueous electrolytic solution for use. As a material of the separator, a polyolefin such as polyethylene, polypropylene or the like, or polyethersulfone or the like is used, and polyolefin is preferable.

As the positive electrode, various known ones may be used without particular limitation. Examples of the positive electrode include one obtained by preparing a slurry by mixing a positive electrode active material, a conductive aid, and a binder for a positive electrode with an organic solvent, applying the prepared slurry to a positive electrode current collector and drying and pressing, and so on.

Examples of the positive electrode active material include an inorganic positive electrode active material and an organic positive electrode active material. Examples of the inorganic positive electrode active material include a transition metal oxide, a composite oxide of lithium and a transition metal, a transition metal sulfide, and so on. Examples of the above transition metal include Fe, Co, Ni, Mn, Al and so on. Examples of the inorganic compound used in the positive electrode active material include: a lithium-containing composite metal oxide, such as $LiCoO_2$, $LiNiO_2$, $LiMnO_2$, $LiMn_2O_4$, $LiFePO_4$, $LiNi_{1/2}Mn_{3/2}O_4$, $LiCo_{1.3}Ni_{1/3}Mn_{1/3}O_2$, $Li[Li_{0.1}Al_{0.1}Mn_{1.8}]O_4$, $LiFeVO_4$ or the like; a transition metal sulfide, such as $TiS_2$, $TiS_3$, amorphous $MoS_2$ or the like; a transition metal oxide, such as $Cu_2V_2O_3$, amorphous $V_2O$—$P_2O_5$, $MoO_3$, $V_2O_5$, $V_6O_{13}$ or the like, and so on. These compounds may be partially element-substituted. Examples of the organic positive electrode active material include a conductive polymer, such as polyacetylene, poly-p-phenylene or the like. An iron-based oxide having poor electric conductivity may be used as an electrode active material covered with a carbon material by allowing a carbon source material to exist during reduction firing. These compounds may be partially element-substituted. Among them, from the viewpoint of practicality, electrical characteristics and long life, $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, and $Li[Li_{0.1}Al_{0.1}Mn_{1.8}]O_4$ are preferable.

Examples of the conductive aid include fibrous carbon such as vapor grown carbon fiber (VGCF), a carbon nanotube (CNT), carbon nanofiber (CNF), carbon black such as graphite particles, acetylene black, Ketjen black, furnace black, fine powders of Cu, Ni, Al, Si or alloys thereof having an average particle diameter of 10 μm or less, and so on.

As the binder for a positive electrode, various known ones may be used without particular limitation, and may be used singly or in combination of two or more thereof. Examples of the binder for a positive electrode include a fluorine-based resin (such as polyvinylidene fluoride, polytetrafluoroethylene or the like), a polyolefin (such as polyethylene, polypropylene or the like), a polymer having an unsaturated bond (such as styrene-butadiene rubber, isoprene rubber, butadiene rubber or the like), an acrylic acid-based polymer (such as an acrylic acid copolymer, a methacrylic acid copolymer or the like), and so on.

Examples of the positive electrode current collector include an aluminum foil, a stainless steel foil and so on.

The form of the above lithium-ion battery is not particularly limited. Examples of the form of the lithium-ion battery include a cylinder type in which a sheet electrode and a separator are formed in a spiral shape, a cylinder type having an inside-out structure in which a pellet electrode and a separator are combined, a coin type in which a pellet electrode and a separator are laminated, and so on. In addition, by accommodating the battery of these forms in an arbitrary outer case, the battery can be used in an arbitrary shape such as a coin shape, a cylindrical shape, a square shape or the like.

A method for producing the above lithium-ion battery is not particularly limited, and the lithium-ion battery may be assembled by an appropriate procedure depending on the structure of the battery. Examples of the method for producing a lithium-ion battery include a method described in Japanese Patent Laid-Open No. 2013-089437, and so on. The battery can be produced in the following manner. A negative electrode is placed on an outer case, an electrolytic solution and a separator are provided thereon, a positive electrode is further placed so as to face the negative electrode, and the positive electrode is fixed with a gasket and a sealing plate.

[Lithium-Ion Battery Negative Electrode Material]

The present disclosure provides a lithium-ion battery negative electrode material, obtained by applying a thermally crosslinkable slurry for a lithium-ion battery negative electrode to a current collector and drying the same, wherein the thermally crosslinkable slurry for a lithium-ion battery negative electrode contains the water-soluble poly(meth)acrylamide (A), water and the negative electrode active material, wherein the water-soluble poly(meth)acrylamide (A) is a polymer of a monomer group containing, with respect to 100 mol % of the monomer group, 2 mol % to 60 mol % of the (meth)acrylamide group-containing compound (a), 10 mol % to 50 mol % of the one or more unsaturated acids selected from the group consisting of unsaturated carboxylic acids and unsaturated sulfonic acids or an inorganic salt thereof (b), and 15 mol % to 78 mol % of the hydroxyalkyl(meth)acrylate (c) having a hydroxyalkyl group having 2 to 4 carbon atoms, wherein the negative electrode active material layer including a dried product of the thermally crosslinkable slurry for a lithium-ion battery negative electrode has a water concentration of 0.3% to 1.0%, and the water-soluble poly(meth)acrylamide (A) after drying is not crosslinked.

Examples of a method for applying the thermally crosslinkable slurry for a lithium-ion battery negative electrode to the current collector include a metal mask printing method, an electrostatic coating method, a dip coating method, a spray coating method, a roll coating method, a doctor blade method, a gravure coating method, a screen printing method, and so on.

The upper limit and lower limit of a drying temperature during preparation of the lithium-ion battery negative electrode material are, for example, 140° C., 130° C., 120° C., 110° C., 100° C., 90° C., 80° C., and so on. In one embodiment, the drying temperature during preparation of the lithium-ion battery negative electrode material is preferably 80° C. to 140° C.

The upper limit and lower limit of a drying time during preparation of the lithium-ion battery negative electrode material are, for example, 10 minutes, 9 minutes, 7 minutes, 5 minutes, 3 minutes, 1 minute, 0.5 minute, and so on. In one embodiment, the drying time during preparation of the lithium-ion battery negative electrode material is preferably 0.5 minute to 10 minutes.

The upper limit and lower limit of the water concentration of the negative electrode active material layer including a dried product of the thermally crosslinkable slurry for a lithium-ion battery negative electrode are, for example, 1%, 0.9%, 0.8%, 0.7%, 0.6%, 0.5%, 0.4%, 0.3%, and so on. In one embodiment, the water concentration of the negative electrode active material layer including a dried product of the thermally crosslinkable slurry for a lithium-ion battery negative electrode is preferably 0.3% to 1.0%.

The water concentration of the negative electrode active material layer including a dried product of the thermally crosslinkable slurry for a lithium-ion battery negative electrode may be measured by the Karl Fischer method (water vaporization method according to JIS K-0068, vaporization temperature: 150° C.) using a coulometric titration moisture meter after standing for an appropriate period of time (for example, 24 hours) in an environment of an appropriate temperature (for example, 25° C.) and an appropriate dew point temperature (for example, −60° C.).

While the gel fraction of the above water-soluble poly(meth)acrylamide (A) after drying is not particularly limited, the upper limit and lower limit of the gel fraction of the above dried component (A) are, for example, 20% by mass, 19% by mass, 17% by mass, 15% by mass, 13% by mass, 11% by mass, 10% by mass, 9% by mass, 7% by mass, 5% by mass, 3% by mass, 2% by mass, 1% by mass, 0% by mass, and so on. In one embodiment, the gel fraction of the water-soluble poly(meth)acrylamide (A) after drying is preferably 0% by mass to 20% by mass.

Moreover, the gel fraction of the water-soluble poly(meth)acrylamide (A) after drying is a value calculated by the following equation:

Gel fraction (%)={insoluble residue (g) in water/mass (g) of solid resin}×100

The mass of the above solid resin is calculated by the following method.

A thermally crosslinkable binder aqueous solution for a lithium-ion battery in an appropriate amount (for example, 10 g), which contains the water-soluble poly(meth)acrylamide (A), is put in an appropriate container (for example, an ointment can (product name "Ointment Can made of tinplate" made by SOGO LABORATORY GLASS WORKS CO., LTD.)), and after drying at an appropriate temperature (for example, 80° C.) by an appropriate dryer (for example, a circulating air dryer (product name "Blower Constant Temperature Dryer DSR420DA" made by Advantec Toyo Kaisha, Ltd.)) so that the concentration of the water-soluble poly(meth)acrylamide (A) reaches a value of the water concentration of the negative electrode active material layer obtained by the above method, a solid resin after thermal crosslinking is obtained. The mass of the solid resin is accurately measured at an appropriate temperature (for example, 25° C.) by an appropriate mass meter (for example, "Standard Balance CPA324S" (product name) made by Sartorius Japan K.K.).

The mass of the above insoluble residue in water is calculated by the following method.

The solid resin in which the thermally crosslinkable binder aqueous solution for a lithium-ion battery in an appropriate amount (for example, 10 g) is condensed to achieve a value calculated by the following equation: The solid resin after thermal crosslinking obtained when the mass of the solid resin is calculated is transferred to a container (for example, a 300 mL beaker) containing pure water in an appropriate amount (for example, 150 mL), and after immersion in water at an appropriate temperature (for example, 25° C.) for an appropriate period of time (for example, 3 hours) under stirring by a magnetic stirrer (for example, "Powerful Magnetic Stirrer RCX-1000D" (product name) made by Tokyo Rikakikai Co., Ltd.), the resultant is filtered under reduced pressure by appropriate filter paper (for example, "No. 50B" made by Kiriyama Glass Works Co.), and using an appropriate filtration tool (for example, a Kiriyama funnel (product name "KIRIYAMA ROHTO SB-60" made by Kiriyama Glass Works Co.) and a suction bell (product name "Suction Bell VKB-200" made by Kiriyama Glass Works Co.)). After that, an insoluble residue remaining on the filter paper is dried at an appropriate temperature (for example, 120° C.) for an appropriate period of time (for example, 3 hours) by an appropriate dryer (for example, the above circulating air dryer), followed by an accurate measurement of the mass of the insoluble residue by an appropriate mass system (for example, the above mass meter) at an appropriate temperature (for example, 25° C.).

[Method for Producing Lithium-Ion Battery]

The present disclosure provides a method for producing a lithium-ion battery, including a drying step in which by heating at 60° C. to 140° C. a laminate having a laminate structure in which the above lithium-ion battery negative electrode material, the separator, the positive electrode for a lithium-ion battery, and the separator are laminated in this order, the water concentration of the negative electrode active material layer is changed into 0.1% or less and the water-soluble poly(meth)acrylamide (A) is crosslinked until achieving a gel fraction of 70% by mass to 100% by mass.

<Laminate>

Figure 2:
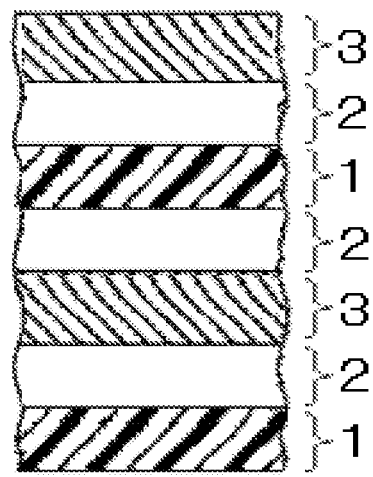
FIG. 2 shows a laminate structure in which a lithium-ion battery negative electrode material (1) according to the present invention, a separator (2), a positive electrode (3) for a lithium-ion battery, and a separator (2) are laminated in this order.

As shown in FIG. 2, the above laminate has a laminate structure in which the above lithium-ion battery negative electrode material (1), the separator (2), the positive electrode (3) for a lithium-ion battery, and the separator (2) are laminated in this order.

The upper limit and lower limit of the thickness of the lithium-ion battery negative electrode material in the above laminate are, for example, 200 µm, 175 µm, 150 µm, 125 µm, 100 µm, 75 µm, 50 µm, 25 µm, 10 µm, and so on. In one embodiment, the thickness of the lithium-ion battery negative electrode material in the above laminate is preferably 10 µm to 200 µm.

The upper limit and lower limit of the thickness of the separator in the above laminate are, for example, 25 µm, 23 µm, 21 µm, 20 µm, 19 µm, 17 µm, 15 µm, 13 µm, 10 µm, 9 µm, 7 µm, 6 µm, and so on. In one embodiment, the thickness of the separator in the above laminate is preferably 6 µm to 25 µm.

The upper limit and lower limit of the thickness of the positive electrode for a lithium-ion battery in the above laminate are, for example, 300 µm, 275 µm, 250 µm, 225 µm, 200 µm, 175 µm, 150 µm, 125 µm, 100 µm, 75 µm, 50 µm, 25 µm, 10 µm, and so on. In one embodiment, the thickness of the positive electrode for a lithium-ion battery in the above laminate is preferably 10 µm to 300 µm.

<Drying Step>

The upper limit and lower limit of the drying temperature in the drying step during battery production are, for example, 140° C., 130° C., 120° C., 110° C., 100° C., 90° C., 80° C., 70° C., 60° C., and so on. In one embodiment, the drying temperature in the drying step during battery production is preferably 60° C. to 140° C.

The upper limit of the water concentration of the negative electrode active material layer after the above drying step is, for example, 0.1% or less, 0.09% or less, 0.05% or less, 0.01% or less, 0.001% or less, 0%, or the like. In one embodiment, the water concentration of the negative electrode active material layer after the above drying step is preferably 0.1% or less, and most preferably 0%.

The upper limit and lower limit of the gel fraction of the water-soluble poly(meth)acrylamide (A) after the above drying step are, for example, 100% by mass, 95% by mass, 90% by mass, 85% by mass, 80% by mass, 75% by mass, 70% by mass, and so on. In one embodiment, the gel fraction of the water-soluble poly(meth)acrylamide (A) after the above drying step is preferably 70% by mass to 100% by mass.

The upper limit and lower limit of the pressure in the above drying step are, for example, 100 Pa, 90 Pa, 75 Pa, 50 Pa, 25 Pa, 10 Pa, 9 Pa, 5 Pa, 2 Pa, 1 Pa, 0.9 Pa, 0.5 Pa, 0.2 Pa, 0.1 Pa, and so on. In one embodiment, the pressure in the above drying step is preferably 0.1 Pa to 100 Pa.

<Electrolytic Solution Injection Step>

In one embodiment, the above production method includes an electrolytic solution injection step of injecting an electrolytic solution after the drying step.

Examples of the electrolyte solution include non-aqueous electrolytic solution in which a supporting electrolyte is dissolved in a non-aqueous solvent, and so on. In addition, a film forming agent may be contained in the above non-aqueous electrolytic solution.

<Other Steps>

In addition, the above method for producing a lithium-ion battery includes, in addition to the above drying step and electrolytic solution injection step, a slurry preparation step of preparing the above thermally crosslinkable slurry for a lithium-ion battery negative electrode, a lithium-ion battery negative electrode material preparation step of applying the above slurry to a current collector and drying the slurry and preparing the lithium-ion battery negative electrode material, a pressing step of pressing the lithium-ion battery negative electrode material, a slit processing step of subjecting the pressed lithium-ion battery negative electrode material to slit processing, and so on.

The slurry preparation step and the lithium-ion battery negative electrode material preparation step may be performed under the above-described conditions. In a conventional method for producing a lithium-ion battery, water is often removed as much as possible in the lithium-ion battery negative electrode material preparation step. The reason is that, if water remains in an electrode of the lithium-ion battery, the remaining water is decomposed into a gas during charging, which adversely affects the characteristics of the lithium-ion battery. However, according to the method of the present invention, in the lithium-ion battery negative electrode material preparation step, the drying is finished with a certain amount of water left.

(Pressing Step)

As the pressing step, although a general method can be used, a mold pressing method or a calendar pressing method is preferable. The pressing pressure is not particularly limited, and is preferably 0.2 t/cm² to 3 t/cm².

(Slit Processing Step)

The slit processing step includes a cutting step of cutting a sheet electrode into predetermined dimensions. The cutting step generally includes a slitting step of slitting the electrode into a predetermined width along a production flow direction and a cutting step of cutting the electrode into a desired length.

According to the present disclosure, the following items are provided.

(Item 1)

A thermally crosslinkable binder aqueous solution for a lithium-ion battery, containing a water-soluble poly(meth)acrylamide (A) and having a pH of 5 to 7, wherein the water-soluble poly(meth)acrylamide (A) is a polymer of a monomer group containing, with respect to 100 mol % of the monomer group, 2 mol % to 60 mol % of a (meth)acrylamide group-containing compound (a), 10 mol % to 50 mol % of one or more unsaturated acids selected from the group consisting of unsaturated carboxylic acids and unsaturated sulfonic acids or an inorganic salt thereof (b), and 15 mol % to 78 mol % of hydroxyalkyl(meth)acrylate (c) having a hydroxyalkyl group having 2 to 4 carbon atoms.

(Item 2)

A thermally crosslinkable slurry for a lithium-ion battery negative electrode, containing the thermally crosslinkable binder aqueous solution for a lithium-ion battery as described in the above Item and a negative electrode active material, and having a pH of 5 to 7.

(Item 3)

The thermally crosslinkable slurry for a lithium-ion battery negative electrode as described in the above Item, containing no particulate polymer.

(Item 4)

A negative electrode for a lithium-ion battery, obtained by applying the thermally crosslinkable slurry for a lithium-ion battery negative electrode as described in any one of the above Items to a current collector, and drying and curing the same.

(Item 5)

A lithium-ion battery, including the negative electrode for a lithium-ion battery as described in the above Item.

(Item 6)

A lithium-ion battery negative electrode material, obtained by applying a thermally crosslinkable slurry for a lithium-ion battery negative electrode to a current collector and drying the same, wherein the thermally crosslinkable slurry for a lithium-ion battery negative electrode contains a water-soluble poly(meth)acrylamide (A), water and a negative electrode active material, wherein
the water-soluble poly(meth)acrylamide (A) is a polymer of a monomer group containing, with respect to 100 mol % of the monomer group, 2 mol % to 60 mol % of a (meth)acrylamide group-containing compound (a), 10 mol % to 50 mol % of one or more unsaturated acids selected from the group consisting of unsaturated carboxylic acids and unsaturated sulfonic acids or an inorganic salt thereof (b), and 15 mol % to 78 mol % of hydroxyalkyl(meth)acrylate (c) having a hydroxyalkyl group having 2 to 4 carbon atoms, wherein a negative electrode active material layer including a dried product of the thermally crosslinkable slurry for a lithium-ion battery negative electrode has a water concentration of 0.3% to 1.0%, and the water-soluble poly(meth)acrylamide (A) after drying is not crosslinked.

(Item 7)

The lithium-ion battery negative electrode material as described in the above Item, wherein a gel fraction of the water-soluble poly(meth)acrylamide (A) after drying is 0% by mass to 20% by mass.

(Item 8)

A method for producing a lithium-ion battery, including: a drying step in which by heating at 60° C. to 140° C. a laminate having a laminate structure in which the lithium-ion battery negative electrode material as described in any one of the above Items, a separator, a positive electrode for a lithium-ion battery, and a separator are laminated in this order, the water concentration of the negative electrode active material layer is changed into 0.1% or less and the water-soluble poly(meth)acrylamide (A) is crosslinked until achieving a gel fraction of 70% by mass to 100% by mass.

(Item 9)

The method for producing a lithium-ion battery as described in the above Item, including an electrolytic solution injection step of injecting an electrolytic solution after the drying step.

(Item 10)

The method for producing a lithium-ion battery as described in any one of the above Items, wherein the drying step is performed at 0.1 Pa to 100 Pa.

In the present disclosure, one or more of the features described above may be provided in combination in addition to the specified combinations.

EXAMPLES

Hereinafter, the present invention will be specifically described through examples and comparative examples. However, the above description of the preferred embodiments and the following examples are provided for illustration only and not for limiting the present invention. Therefore, the scope of the present invention is not limited to the embodiments or examples specifically described herein, but only by the claims. In addition, in each of the examples and comparative examples, unless otherwise specified, numerical values such as part, % and so on are based on mass.

1. Preparation of Component (A)

Example 1-1

In a reactor equipped with a stirrer, a thermometer, a reflux condenser and a nitrogen gas introduction pipe, 1,200 g of ion-exchanged water, 100 g (0.70 mol) of 50% acrylamide aqueous solution, 63.4 g (0.70 mol) of 80% acrylic acid, 69.8 g (0.60 mol) of 2-hydroxyethyl acrylate and 0.32 g (0.0020 mol) of sodium methallylsulfonate were put, and after oxygen in the reaction system was removed through nitrogen gas, the resultant was heated to 55° C. 1.7 g of 2,2'-azobis-2-amidinopropane dihydrochloride (product name "NC-32" made by NIPPOH CHEMICALS CO., LTD.) and 15 g of ion-exchanged water were put therein, and the resultant was heated to 80° C. and reacted for 3 hours. After that, 52.7 g (0.63 mol) of 48% sodium hydroxide aqueous solution as a neutralizer was added and stirred, and ion-exchanged water was added so as to achieve a solid content concentration of 13%, and an aqueous solution containing a water-soluble polyacrylamide was obtained. The pH of this solution at 25° C. was 6.0.

Examples 1-2 to 1-6

An aqueous solution containing a water-soluble poly (meth)acrylamide was prepared in the same manner as in Example 1-1, except that the monomer composition and the amount of the neutralizer in Example 1-1 were changed to those shown in the following table.

Comparative Example 1-1

In a reactor equipped with a stirrer, a thermometer, a reflux condenser and a nitrogen gas introduction pipe, 1,200 g of ion-exchanged water, 100 g (0.70 mol) of 50% acrylamide aqueous solution, 63.4 g (0.70 mol) of 80% acrylic acid, 69.8 g (0.60 mol) of 2-hydroxyethyl acrylate and 0.32 g (0.0020 mol) of sodium methallylsulfonate were put, and after oxygen in the reaction system was removed through nitrogen gas, the resultant was heated to 55° C. 1.7 g of 2,2'-azobis-2-amidinopropane dihydrochloride (product name "NC-32" made by NIPPOH CHEMICALS CO., LTD.) and 15 g of ion-exchanged water were put therein, and the resultant was heated to 80° C. and reacted for 3 hours. After that, ion-exchanged water was added so as to achieve a solid content concentration of 13%, and an aqueous solution containing a water-soluble polyacrylamide was obtained. The pH of this solution at 25° C. was 3.2.

Comparative Example 1-2

In a reactor equipped with a stirrer, a thermometer, a reflux condenser and a nitrogen gas introduction pipe, 1,200 g of ion-exchanged water, 100 g (0.70 mol) of 50% acrylamide aqueous solution, 63.4 g (0.70 mol) of 80% acrylic acid, 69.8 g (0.60 mol) of 2-hydroxyethyl acrylate and 0.32 g (0.0020 mol) of sodium methallylsulfonate were put, and after oxygen in the reaction system was removed through nitrogen gas, the resultant was heated to 55° C. 1.7 g of 2,2'-azobis-2-amidinopropane dihydrochloride (product name "NC-32" made by NIPPOH CHEMICALS CO., LTD.) and 15 g of ion-exchanged water were put therein, and the resultant was heated to 80° C. and reacted for 3 hours. After that, 29.3 g (0.35 mol) of 48% sodium hydroxide aqueous solution as a neutralizer was added and stirred, and ion-exchanged water was added so as to achieve a solid content concentration of 13%, and an aqueous solution containing a water-soluble polyacrylamide was obtained. The pH of this solution at 25° C. was 4.4.

Comparative Examples 1-3 to 1-6

An aqueous solution containing a water-soluble poly (meth)acrylamide was prepared in the same manner as in Comparative Example 1-2, except that the monomer composition and the amount of the neutralizer in Comparative Example 1-2 were changed to those shown in the following table.

B-type Viscosity

The viscosity of each binder aqueous solution was measured at 25° C. under the following conditions using a B-type viscometer (product name "B-type Viscometer Model BM" made by Toki Sangyo Co., Ltd.).

When the viscosity was 100,000 mPa·s to 20,000 mPa·s: No. 4 rotor was used at a rotational speed of 6 rpm; when the viscosity was less than 20,000 mPa·s: No. 3 rotor was used at a rotational speed of 6 rpm.

Weight Average Molecular Weight

The weight average molecular weight was calculated as a value in terms of polyacrylic acid as measured by gel permeation chromatography (GPC) under a 0.2 M phosphate buffer/acetonitrile solution (90/10, PH 8.0). HLC-8220 (made by Tosoh Corporation) was used as a GPC device, and SB-806M-HQ (made by SHODEX) was used as a column.

pH

The pH of each binder aqueous solution was measured at 25° C. using a glass electrode pH meter (product name "Handy pH Meter D-52" made by Horiba, Ltd.).

TABLE 1

| | (Meth)acrylamide group-containing compound (a) | | One or more unsaturated acids selected from the group consisting of unsaturated carboxylic acids and unsaturated sulfonic acids or inorganic salt thereof (b) | | Hydroxy-alkyl(meth)acrylate (c) having a hydroxyalkyl group having 2 to 4 carbon atoms | | Other copolymerizable monomer (d) | | Neutralizer (amount with respect to acid component (b)) | | B-type viscosity | Molecular weight | |
|---|---|---|---|---|---|---|---|---|---|---|---|---|---|
| | AM (mol %) | DMAA (mol %) | AA (mol %) | ATBS (mol %) | HEA (mol %) | HBA (mol %) | AN (mol %) | SMAS (mol %) | NaOH (mol %) | LiOH (mol %) | (mPa · s) | (Mw) | pH |
| Example 1-1 | 35 | — | 35 | — | 29.9 | — | — | 0.1 | 90 | — | 3,000 | 700,000 | 6.0 |
| Example 1-2 | 3 | — | 40 | — | 56.9 | — | — | 0.1 | 80 | — | 6,000 | 850,000 | 5.7 |
| Example 1-3 | 3.9 | 32 | 20 | — | 44 | — | — | 0.1 | 75 | — | 5,000 | 750,000 | 5.1 |
| Example 1-4 | 38.9 | — | 25 | — | 16 | — | 20 | 0.1 | — | 90 | 3,000 | 650,000 | 6.4 |
| Example 1-5 | 57.9 | — | 20 | — | — | 22 | — | 0.1 | 80 | — | 5,000 | 750,000 | 5.8 |
| Example 1-6 | 34.9 | — | 4 | 36 | 25 | — | — | 0.1 | 95 | — | 1,500 | 600,000 | 5.4 |
| Comparative Example 1-1 | 35 | — | 35 | — | 29.9 | — | — | 0.1 | — | — | 5,000 | 700,000 | 3.2 |
| Comparative Example 1-2 | 35 | — | 35 | — | 29.9 | — | — | 0.1 | 50 | — | 4,000 | 700,000 | 4.4 |
| Comparative Example 1-3 | 35 | — | 35 | — | 29.9 | — | — | 0.1 | 100 | — | 3,000 | 700,000 | 8.5 |
| Comparative Example 1-4 | 35 | — | 35 | — | 29.9 | — | — | 0.1 | 120 | — | 3,000 | 700,000 | 9.5 |

TABLE 1-continued

| | (Meth)acrylamide group-containing compound (a) | | One or more unsaturated acids selected from the group consisting of unsaturated carboxylic acids and unsaturated sulfonic acids or inorganic salt thereof (b) | | Hydroxy-alkyl(meth)acrylate (c) having a hydroxyalkyl group having 2 to 4 carbon atoms | | Other copolymerizable monomer (d) | | Neutralizer (amount with respect to acid component (b)) | | B-type viscosity (mPa·s) | Molecular weight (Mw) | pH |
|---|---|---|---|---|---|---|---|---|---|---|---|---|---|
| | AM (mol %) | DMAA (mol %) | AA (mol %) | ATBS (mol %) | HEA (mol %) | HBA (mol %) | AN (mol %) | SMAS (mol %) | NaOH (mol %) | LiOH (mol %) | | | |
| Comparative Example 1-5 | 59.9 | — | 40 | — | — | — | — | 0.1 | 110 | — | 20,000 | 720,000 | 9.2 |
| Comparative Example 1-6 | 59.9 | — | 38 | — | — | 2 | — | 0.1 | — | — | 15,000 | 710,000 | 2.8 |

AM: Acrylamide ("50% Acrylamide" made by Mitsubishi Chemical Corporation)
DMAA: N,N-dimethylacrylamide ("DMAA" made by KJ Chemicals Corporation)
AA: Acrylic acid ("80% Acrylic Acid" made by Osaka Organic Chemical Industry Ltd.)
ATBS: Acrylamide t-butylsulfonic acid ("ATBS" made by Toagosei Company, Limited)
HEA: 2-hydroxyethyl acrylate ("HEA" made by Osaka Organic Chemical Industry Ltd.)
HBA: 4-hydroxybutyl acrylate ("4HBA" made by Mitsubishi Chemical Corporation)
AN: Acrylonitrile ("Acrylonitrile" made by Mitsubishi Chemical Corporation)
SMAS: Sodium methallyl sulfonate
NaOH: Sodium hydroxide ("48% Sodium Hydroxide Solution" made by Kanto Chemical Co., Inc.)
LiOH: Lithium hydroxide ("Lithium Hydroxide Monohydrate" made by FUJIFILM Wako Pure Chemical Corporation)

<Storage Stability Test for Binder Solution and Change in Viscosity Thereof>

The viscosity (unit: mPa·s) of a binder solution at 25° C. was measured by a B-type viscometer, followed by storage in an oven heated to 40° C. for 3 days. After storage, the viscosity at 25° C. was measured again by the B-type viscometer. A change in viscosity was calculated by the following equation and was evaluated according to the following evaluation criteria.

Change in viscosity (%)=[{(viscosity of binder solution after storage)−(viscosity of binder solution before storage)}/(viscosity of binder solution before storage)]×100

A: Change in viscosity was less than 10%.
B: Change in viscosity was 10% or more and less than 30%.
C: Change in viscosity was 30% or more.

<Storage Stability Test for Binder Solution and Change in pH Thereof>

The pH of a binder solution at 25° C. was measured by a glass electrode pH meter, followed by storage in an oven heated to 40° C. for 3 days. After storage, the pH at 25° C. was measured again by the glass electrode pH meter. A change in pH was calculated by the following equation and was evaluated according to the following evaluation criteria.

Change in pH=(pH of binder solution before storage)−(pH of binder solution after storage)

A: Change in pH was less than 0.5.
B: Change in pH was 0.5 or more and less than 1.0.
C: Change in pH was 1.0 or more.

TABLE 2

| | Storage stability of binder solution | |
|---|---|---|
| | Change in viscosity | Change in pH |
| Example 1-1 | A | A |
| Example 1-2 | A | A |
| Example 1-3 | A | A |
| Example 1-4 | A | A |
| Example 1-5 | A | A |
| Example 1-6 | A | A |
| Comparative Example 1-1 | C | A |
| Comparative Example 1-2 | B | A |
| Comparative Example 1-3 | B | B |
| Comparative Example 1-4 | B | C |

2. Preparation of Slurry, Production of Cell and Evaluation

Example 2-1

A thermally crosslinkable binder aqueous solution for a lithium-ion battery in an amount of 5 parts by mass in terms of solid content, which contained the water-soluble poly (meth)acrylamide (A) obtained in Example 1-1, was mixed with 20 parts by mass of silicon monoxide particles ("CC Powder" made by OSAKA Titanium technologies Co., Ltd.) having a D50 (median diameter) of 5 μm and 80 parts by mass of natural graphite (product name "Z-5F" made by Ito Graphite Co., Ltd.) using a commercially available rotation/revolution mixer ("Awatori Rentaro" made by THINKY CORPORATION) in a container dedicated to the mixer. Ion-exchanged water was added thereto so as to achieve a solid content concentration of 40%, and the container was set in the above mixer. Next, after kneading at 2,000 rpm for 10 minutes, defoaming was performed for 1 minute and a slurry was obtained. The pH of this slurry at 25° C. was 6.4.

Examples 2-2 to 2-7 and Comparative Examples 2-1 to 2-4

A slurry was prepared in the same manner as in Example 2-1, except that the composition in Example 2-1 was changed to those shown in the following table.

Comparative Example 2-5

A thermally crosslinkable binder aqueous solution for a lithium-ion battery in an amount of 5 parts by mass in terms of solid content, which contained the water-soluble poly (meth)acrylamide (A) obtained in Example 1-1, was mixed with 20 parts by mass of silicon monoxide particles ("CC Powder" made by OSAKA Titanium technologies Co., Ltd.) having a D50 of 5 μm and 80 parts by mass of natural graphite (product name "Z-5F" made by Ito Graphite Co., Ltd.) using a commercially available rotation/revolution mixer ("Awatori Rentaro" made by THINKY CORPORATION) in a container dedicated to the mixer. Ion-exchanged water was added thereto so as to achieve a solid content concentration of 40%, and the container was set in the above mixer. Next, after kneading at 2,000 rpm for 10 minutes, defoaming was performed for 1 minute. 48% sodium hydroxide aqueous solution was added to an obtained slurry, and the pH of the slurry was adjusted to 9.0. The pH of this slurry at 25° C. was 9.0.

Comparative Example 2-6

A thermally crosslinkable binder aqueous solution for a lithium-ion battery in an amount of 5 parts by mass in terms of solid content, which contained the water-soluble poly (meth)acrylamide (A) obtained in Example 1-1, was mixed with 20 parts by mass of silicon monoxide particles ("CC Powder" made by OSAKA Titanium technologies Co., Ltd.) having a D50 of 5 μm and 80 parts by mass of natural graphite (product name "Z-5F" made by Ito Graphite Co., Ltd.) using a commercially available rotation/revolution mixer ("Awatori Rentaro" made by THINKY CORPORATION) in a container dedicated to the mixer. Ion-exchanged water was added thereto so as to achieve a solid content concentration of 40%, and the container was set in the above mixer. Next, after kneading at 2,000 rpm for 10 minutes, defoaming was performed for 1 minute. Sulfuric acid was added to an obtained slurry, and the pH of the slurry was adjusted to 3.5. The pH of this slurry at 25° C. was 3.5.

pH

The pH of each slurry was measured at 25° C. using a glass electrode pH meter (product name "Handy pH Meter D-52" made by Horiba, Ltd.).

<Production of Negative Electrode>

The obtained slurry was uniformly applied to a surface of a current collector composed of copper foil by a doctor blade method so that a film thickness after drying would be 80 μm. After drying at 80° C. for 1 hour, the resultant was subjected to a heating treatment at 150° C. in vacuum for 2 hours, and an electrode was obtained. After that, by press processing by a roll press machine to achieve a film (electrode active material layer) density of 1.5 g/cm$^3$, an electrode was obtained. A lithium half-cell was produced using the obtained electrode by the following procedure, a charge and discharge measurement was carried out, and a springback ratio was calculated.

<Evaluation of Dispersibility of Slurry>

The dispersibility of a slurry immediately after preparation thereof was visually evaluated according to the following criteria.

A: The whole was in a homogeneous paste form, no liquid separation was present and no aggregates were observed.

B: The whole was in a substantially homogeneous paste form, slight liquid separation was observed, but no aggregates were observed.

C: A small number of aggregates and a large amount of liquid separation were observed at the bottom of the container.

<Electrode Flexibility>

The electrode was cut into a width of 10 mm and a length of 70 mm, and was wound around a Teflon™ rod having a diameter of 6 mmØ with an active material layer facing outward. A state of a surface of the active material layer was observed and evaluated according to the following criteria.

A: No cracks and peeling occurred at all in the active material layer bound on the current collector.

B: Cracks were seen in the active material layer bound on the current collector, but no peeling was observed.

C: Cracks were seen and peeling was observed in the active material layer bound on the current collector.

<Assembly of Lithium Half-Cell>

In an argon-purged glove box, the above electrode was punched and formed to have a diameter of 16 mm, and the resultant was placed inside a packing above an aluminum lower lid of a test cell (made by Nippon Tomcell Co., Ltd.). Next, a separator (product name "Selion P2010" made by CS Tech Co., Ltd.) composed of a polypropylene porous film punched out to a diameter of 24 mm was placed. Further, after an electrolytic solution was poured in so that no air could enter, a metallic lithium foil punched and formed into a size of 16 mm was placed thereon. After that, a disk made of SUS and a leaf spring were placed in order to uniformly press the electrode and the metallic lithium; finally, an upper cover made of SUS was placed and then was evenly tightened using a nut. The electrolytic solution used here was a solution in which $LiPF_6$ was dissolved at a concentration of 1 mol/L in a solvent having a mass ratio of ethylene carbonate to ethyl methyl carbonate of 1/1.

<Charge and Discharge Measurement>

The lithium half-cell was put in a constant temperature bath set to 25° C. and underwent charging and discharging as follows. The charging was started at a constant current (0.1 C) and was completed (cutoff) when the voltage reached 0.01 V. Next, the discharging was started at a constant current (0.1 C) and was completed (cutoff) when the voltage reached 1.0 V. The above charging and discharging were repeated 30 times.

In the above measurement conditions, "1 C" indicates a current value at which a cell having a certain electric capacity is discharged at a constant current and the discharging is completed in 1 hour. For example, "0.1 C" means a current value at which it takes 10 hours to complete discharging, and "10 C" means a current value at which it takes 0.1 hour to complete discharging.

<Measurement of Initial Coulombic Efficiency>

The initial Coulombic efficiency was calculated by the following equation from values of initial charge capacity (mAh) and initial discharge capacity (mAh) when a charge and discharge cycle test was carried out at room temperature (25° C.).

Initial Coulombic efficiency={(initial discharge capacity)/(initial charge capacity)}×100

<Measurement of Springback Ratio>

After the charge and discharge cycle test was carried out 30 cycles at room temperature (25° C.), the lithium half-cell was disassembled and the thickness of the electrode was measured. A springback ratio of the electrode was calculated by the following equation:

Springback ratio={(electrode thickness after 30 cycles−current collector thickness)/(electrode thickness before charging and discharging−current collector thickness)}×100−100(%)

and a drying time of 1 minute, and a negative electrode material was obtained. The obtained negative electrode material was cut out into a predetermined size, and was evaluated by the following methods for water concentration, gel fraction, tackiness of electrode surface, cracks, peeling and edge chipping.

TABLE 3

| | Negative electrode active material | | Thermally crosslinkable binder aqueous solution | | | | | | |
|---|---|---|---|---|---|---|---|---|---|
| | Silicon monoxide | Natural graphite | | | pH of electrode slurry | Dispersibility of electrode slurry | Electrode flexibility | Initial Coulombic efficiency (%) | Springback ratio (%) |
| | Part by mass | Part by mass | Name | Part by mass | | | | | |
| Example 2-1 | 20 | 80 | Example 1-1 | 5.0 | 6.4 | A | A | 74 | +37 |
| Example 2-2 | 50 | 50 | Example 1-2 | 7.0 | 6.0 | A | A | 68 | +45 |
| Example 2-3 | 50 | 50 | Example 1-3 | 7.0 | 5.3 | A | A | 67 | +48 |
| Example 2-4 | 20 | 80 | Example 1-4 | 5.0 | 6.8 | B | A | 73 | +44 |
| Example 2-5 | 20 | 80 | Example 1-5 | 5.0 | 6.2 | A | A | 73 | +39 |
| Example 2-6 | 20 | 80 | Example 1-6 | 5.0 | 5.9 | A | A | 72 | +41 |
| Example 2-7 | 0 | 100 | Example 1-1 | 3.0 | 6.1 | A | A | 89 | +25 |
| Comparative Example 2-1 | 20 | 80 | Comparative Example 1-1 | 5.0 | 3.5 | C | C | 64 | +78 |
| Comparative Example 2-2 | 20 | 80 | Comparative Example 1-2 | 5.0 | 4.7 | B | B | 68 | +65 |
| Comparative Example 2-3 | 20 | 80 | Comparative Example 1-3 | 5.0 | 8.7 | B | B | 69 | +57 |
| Comparative Example 2-4 | 20 | 80 | Comparative Example 1-4 | 5.0 | 9.6 | C | C | 66 | +64 |
| Comparative Example 2-5 | 20 | 80 | Example 1-1 | 5.0 | 9.0 | B | B | 67 | +61 |
| Comparative Example 2-6 | 20 | 80 | Example 1-1 | 5.0 | 3.5 | C | C | 65 | +75 |

As is clear from the above table, the slurry prepared using the binder aqueous solution of the examples and the lithium half-cell produced from this slurry were both evaluated as satisfactory in the evaluations of dispersibility of slurry, electrode flexibility, initial Coulombic efficiency, and springback ratio.

Example 3-1

<Preparation of Slurry>

A thermally crosslinkable binder aqueous solution for a lithium-ion battery in an amount of 5 parts by mass in terms of solid content, which contained the water-soluble poly(meth)acrylamide (A) obtained in Example 1-1, was mixed with 20 parts by mass of silicon monoxide particles ("CC Powder" made by OSAKA Titanium technologies Co., Ltd.) having a D50 of 5 μm and 80 parts by mass of natural graphite (product name "Z-5F" made by Ito Graphite Co., Ltd.) using a commercially available rotation/revolution mixer ("Awatori Rentaro" made by THINKY CORPORATION) in a container dedicated to the mixer. Ion-exchanged water was added thereto so as to achieve a solid content concentration of 40%, and the container was set in the above mixer. Next, after kneading at 2,000 rpm for 10 minutes, defoaming was performed for 1 minute and a slurry for an electrode was obtained.

<Preparation of Negative Electrode Material>

The obtained slurry was uniformly applied to a surface of a current collector composed of copper foil using a comma coater (model TM-MC made by HIRANO TECSEED Co., Ltd.) so that a film thickness after drying would be 80 μm, coated at a line speed under a drying temperature of 80° C.

<Water Concentration of Negative Electrode Material>

The electrode was cut out into a size of 10 cm in width and 10 cm in length, which was taken as a test piece. This test piece was left to stand for 24 hours in an environment of a temperature of 25° C. and a dew point temperature of −60° C. Then, a water content of the test piece was measured by the Karl Fischer method (water vaporization method according to JIS K-0068, vaporization temperature: 150° C.) using a coulometric titration moisture meter. The water content was taken as a water concentration of a negative electrode active material layer. The measurement was performed in a glove box having a dew point of −60° C. to prevent mixing in of water.

<Gel Fraction>

10 g of a thermally crosslinkable binder aqueous solution for a lithium-ion battery, which contained the water-soluble poly(meth)acrylamide (A), was put in an ointment can (product name "Ointment Can made of tinplate" made by SOGO LABORATORY GLASS WORKS CO., LTD.), and after drying at 80° C. by a circulating air dryer (product name "Blower Constant Temperature Dryer DSR420DA" made by Advantec Toyo Kaisha, Ltd.) so that the concentration of the water-soluble poly(meth)acrylamide (A) reached a value of the water concentration of the negative electrode active material layer obtained above, a solid resin after thermal crosslinking was obtained. The mass of the solid resin was accurately measured at 25° C. by a mass meter (product name "Standard Balance CPA324S" made by Sartorius Japan K.K.). The thermal crosslinked solid resin in which 10 g of the thermally crosslinkable binder aqueous solution for a lithium-ion battery was condensed to achieve a value calculated by the following equation: Concentration of water-soluble poly(meth)acrylamide in negative electrode material=mass of water contained in negative electrode/mass of water-soluble poly(meth)acrylamide (A), was transferred to a container (300 mL beaker) containing 150 mL of pure water, and after immersion in water at 25° C. for 3 hours under stirring by a magnetic stirrer (product name "Powerful Magnetic Stirrer RCX-1000D" made by Tokyo Rikakikai Co., Ltd.), the resultant was filtered under reduced pressure by filter paper ("No. 50B" made by Kiriyama Glass Works Co.) using a Kiriyama funnel (product name "KIRIYAMA ROHTO SB-60" made by Kiriyama Glass Works Co.) and a suction bell (product name "Suction Bell VKB-200" made by Kiriyama Glass Works Co.). After that, an insoluble residue remaining on the filter paper was dried at 120° C. for 3 hours by the above circulating air dryer, followed by an accurate measurement of the mass of the insoluble residue by the above mass meter at 25° C., and a gel fraction of the resin after thermal crosslinking of the water-soluble binder for a battery was calculated from the following equation:

Gel fraction (%)={insoluble residue (g)/mass (g) of solid resin}×100

<Tackiness of Electrode Surface>

The electrode was cut into a width of 1 cm and a length of 7 cm, and a separator having a width of 1.5 cm and a length of 8 cm was disposed on a negative electrode layer side and was fixed by pressure by reciprocating a 2 kg roller twice. After that, the separator was peeled off by hand, and the state of the separator was evaluated according to the following criteria.
A: The separator was cleanly peeled off
B: The separator was peeled off but had the negative electrode material adhering to its surface
C: The separator stuck to the electrode and was not peeled off at all
<Cracks of Electrode>

The electrode was cut into a width of 1 cm and a length of 7 cm, and was wound around a Teflon™ rod having a diameter of 6 mmØ with an active material layer facing outward. A state of a surface of the active material layer was observed and evaluated according to the following criteria.
A: No cracks and peeling occurred at all in the active material layer bound on the current collector.
B: Cracks were seen in the active material layer bound on the current collector, but no peeling was observed.
C: Cracks were seen and peeling was observed in the active material layer bound on the current collector.
<Peeling of Electrode>

The electrode was cut into a width of 5 cm and a length of 10 cm. A surface of the electrode when the electrode was pressed to a predetermined thickness by a roll press machine (Small Heating Roll Press made by Takumi Giken Co., Ltd.) was observed and evaluated according to the following criteria.
A: The active material layer bound on the current collector was not peeled off at all
B: A part of the active material layer bound on the current collector was peeled off
C: Most of the active material layer bound on the current collector was peeled off
<Edge Chipping of Electrode>

The electrode was cut into a width of 5 cm and a length of 10 cm, and pressed to a predetermined thickness by a roll press machine (Small Heating Roll Press made by Takumi Giken Co., Ltd.). When the thus obtained electrode was punched out into a circular shape of Ø 25 mm using an electrode punching machine, a surface of the electrode was observed and evaluated according to the following criteria.
A: No chipping of the active material layer was seen at an edge of the punched electrode
B: Chipping of the active material layer was seen at an edge of the punched electrode Examples 3-2 to 3-7

A negative electrode active material layer was obtained in the same manner as in Example 3-1, except that the composition of the negative electrode was changed to those shown in the following table.

Comparative Example 3-1

A negative electrode active material layer was obtained in the same manner as in Example 3-1, except that the electrode obtained in Example 3-1 was further dried under reduced pressure at 150° C. in a vacuum for 2 hours.

Comparative Examples 3-2 to 3-5

A negative electrode active material layer was obtained in the same manner as in Example 3-1, except that the composition of the negative electrode was changed to those shown in the following table.
<Production of Negative Electrode>

The obtained negative electrode active material layer was subjected to press processing by a roll press machine so as to achieve a density of 1.5 g/cm³, cut into a predetermined shape (rectangular shape of 50 mm×150 mm), and an electrode for negative electrode was obtained.

TABLE 4

| | Active material | | Thermally crosslinkable binder aqueous solution | | Water concentration (%) of negative electrode active material layer | Gel fraction (%) of water-soluble poly(meth)acrylamide (A) | Tackiness | Cracks | Peeling | Edge chipping |
|---|---|---|---|---|---|---|---|---|---|---|
| | Silicon monoxide | Natural graphite | | | | | | | | |
| | Part by mass | Part by mass | Name | Part by mass | | | | | | |
| Example 3-1 | 20 | 80 | Example 1-1 | 5 | 0.50 | 16.0 | A | A | A | A |
| Example 3-2 | 20 | 80 | Example 1-2 | 5 | 0.63 | 8.4 | A | A | A | A |
| Example 3-3 | 20 | 80 | Example 1-3 | 5 | 0.68 | 4.5 | A | A | A | A |
| Example 3-4 | 20 | 80 | Example 1-4 | 5 | 0.43 | 5.5 | A | A | A | A |
| Example 3-5 | 20 | 80 | Example 1-5 | 5 | 0.52 | 2.3 | A | A | A | A |

TABLE 4-continued

| | Active material | | Thermally crosslinkable binder aqueous solution | | Water concentration (%) of negative electrode active material layer | Gel fraction (%) of water-soluble poly(meth)acrylamide (A) | Tackiness | Cracks | Peeling | Edge chipping |
|---|---|---|---|---|---|---|---|---|---|---|
| | Silicon monoxide Part by mass | Natural graphite Part by mass | Name | Part by mass | | | | | | |
| Example 3-6 | 20 | 80 | Example 1-6 | 5 | 0.81 | 15.5 | A | A | A | A |
| Example 3-7 | 50 | 50 | Example 1-1 | 5 | 0.72 | 15.1 | A | A | A | A |
| Comparative Example 3-1 | 20 | 80 | Example 1-2 | 5 | 0.08 | 80.0 | A | C | A | B |
| Comparative Example 3-2 | 20 | 80 | Example 1-2 | 5 | 3.40 | 2.1 | C | A | C | A |
| Comparative Example 3-3 | 20 | 80 | Example 1-6 | 5 | 2.50 | 0.0 | C | C | B | A |
| Comparative Example 3-4 | 20 | 80 | Comparative Example 1-5 | 5 | 2.20 | 0.0 | C | C | B | A |
| Comparative Example 3-5 | 20 | 80 | Comparative Example 1-6 | 5 | 3.50 | 0.0 | C | C | B | A |

<Production of Positive Electrode>

$LiNi_{0.5}Co_{0.2}Mn_{0.3}O_2$ as a positive electrode active material, acetylene black as a conductive aid and polyvinylidene fluoride (PVDF) as a binder, in the amounts of 88 parts by mass, 6 parts by mass and 6 parts by mass respectively, were mixed together. This mixture was dispersed in an appropriate amount of N-methyl-2-pyrrolidone (NMP), and a slurry for a lithium-ion battery positive electrode was prepared. Next, an aluminum foil as a collector of the positive electrode was prepared. The slurry for a laminate type lithium-ion battery positive electrode was placed thereon and applied in a film form using a doctor blade. After being applied with the slurry for a laminate type lithium-ion battery positive electrode, the aluminum foil was dried at 80° C. for 20 minutes and the NMP was volatilized and removed, followed by close bonding by a roll press machine. At this time, the density of the positive electrode active material layer was set to 3.2 g/cm³. The bonded product was heated at 120° C. for 6 hours in a vacuum dryer, and cut into a predetermined shape (rectangular shape of 50 mm×150 mm) to obtain a positive electrode having a positive electrode active material layer of about 45 μm in thickness.

Example 4-1

A separator composed of a polypropylene porous film (product name "Selion P2010" made by CS Tech Co., Ltd.) was sandwiched between the above negative electrode and positive electrode by a rectangular sheet (55 mm×155 mm, and 25 μm in thickness) and taken as an electrode plate group. This electrode plate group was dried at 100° C. and 0.3 Pa for 24 hours, the thus obtained electrode plate group was disassembled, only the negative electrode was taken out and the water concentration thereof was calculated. The gel fraction was calculated by the same method as the above gel fraction calculation method, except that the drying condition of the insoluble residue remaining on the filter paper was changed from 120° C. for 3 hours to 100° C., 0.3 Pa for 24 hours.

Examples 4-2 to 4-7 and Comparative Example 4-2

A negative electrode active material layer was obtained in the same manner as in Example 4-1, except that the negative electrode was changed to those shown in the following table.

Comparative Example 4-1

A negative electrode active material layer was obtained in the same manner as in Example 4-1, except that the drying was performed at 100° C. under normal pressure for 24 hours.

<Production of Lithium-Ion Battery>

A separator composed of a polypropylene porous film (product name "Selion P2010" made by CS Tech Co., Ltd.) was sandwiched between the above negative electrode and positive electrode by a rectangular sheet (55 mm×155 mm, and 25 μm in thickness) and taken as an electrode plate group. This electrode plate group was dried at 100° C. and 0.3 Pa for 24 hours, the thus obtained electrode plate group was covered with a pair of laminate films and three sides thereof were sealed, and then, an electrolyte solution was injected into the bag-shaped laminate film. As the electrolytic solution, a solution in which $LiPF_6$ was dissolved at a concentration of 1 mol/L in a solvent having a mass ratio of ethylene carbonate to ethyl methyl carbonate of 1/1 was used. After that, by sealing the remaining one side, the four sides were air-tightly sealed, and a laminate type lithium-ion secondary battery was obtained in which the electrode plate group and the electrolytic solution were sealed. Moreover, the positive electrode and the negative electrode included a tab electrically connectable with the outside, a part of this tab extending outside the laminate type lithium-ion secondary battery.

<Capacity Retention Rate>

The lithium-ion secondary battery produced above was charged at 25° C. at 0.1 C at a voltage of 2.5 V to 4.2 V. When the voltage reached 4.2 V, the charging was continued at a constant voltage (4.2 V); when the current value reached 0.01 C, the charging was completed (cutoff). Next, discharging was performed at 0.1 C until 2.5 V was reached, and such charging and discharging were repeated 5 times. From the 6th cycle onward, only the discharging current was changed to 0.5 C and such charging and discharging were repeated 50 cycles. A ratio of discharge capacity at 0.5 C in the 50th cycle to the discharge capacity at 0.5 C in the 6th cycle was calculated as a percentage, which was taken as a capacity retention rate.

<Measurement of Springback Ratio>

After the charge and discharge cycle test was carried out 50 cycles at room temperature (25° C.), the laminate type lithium-ion battery cell was disassembled, and the thickness of an electrode was measured. A springback ratio of the electrode was calculated by the following equation:

Springback ratio={(electrode thickness after 50 cycles−current collector thickness)/(electrode thickness before charging and discharging−current collector thickness)}×100−100(%)

<Volume Expansion Rate>

The above laminate type lithium-ion secondary battery was charged at 25° C. at 0.1 C at a voltage of 2.5 V to 4.2 V. When the voltage reached 4.2 V, the charging was continued at a constant voltage (4.2 V); when the current value reached 0.01 C, the charging was completed (cutoff). A 1,000 mL container was filled with 25° C. water. The laminate type lithium-ion battery of which charging was completed was immersed therein and the volume of water overflowing was taken as the volume of the laminate type lithium-ion battery. After standing at 70° C. for 10 days, the laminate type lithium-ion battery was measured again for its volume.

Volume expansion rate={(volume after standing at 70° C. for 10 days after completion of charging)/(volume immediately after charging)}×100−100(%)

TABLE 5

| | Negative electrode | Water concentration (%) of negative electrode active material layer | Gel fraction (%) of water-soluble poly(meth)acrylamide (A) | Springback ratio (%) | Capacity retention ratio (%) | Volume expansion rate (%) |
|---|---|---|---|---|---|---|
| Example 4-1 | Example 3-1 | 0.05 | 93.2 | 35 | 91 | 1 |
| Example 4-2 | Example 3-2 | 0.06 | 86.8 | 39 | 86 | 2 |
| Example 4-3 | Example 3-3 | 0.05 | 84.6 | 45 | 81 | 3 |
| Example 4-4 | Example 3-4 | 0.07 | 72.4 | 47 | 80 | 2 |
| Example 4-5 | Example 3-5 | 0.04 | 76.2 | 42 | 76 | 2 |
| Example 4-6 | Example 3-6 | 0.06 | 88.4 | 40 | 83 | 1 |
| Example 4-7 | Example 3-7 | 0.03 | 92.5 | 52 | 85 | 4 |
| Comparative Example 4-1 | Example 3-1 | 0.40 | 51.0 | 85 | 61 | 21 |
| Comparative Example 4-2 | Comparative Example 3-4 | 0.07 | 0.0 | 113 | 52 | 2 |

What is claimed is:

1. A thermally crosslinkable binder aqueous solution for a lithium-ion battery, containing a water-soluble poly(meth)acrylamide (A) and having a pH of 5 to 7, wherein
the water-soluble poly(meth)acrylamide (A) is a polymer of a monomer group containing, with respect to 100 mol % of the monomer group,
2 mol % to 60 mol % of a (meth)acrylamide group-containing compound (a),
10 mol % to 50 mol % of one or more unsaturated acids selected from the group consisting of unsaturated carboxylic acids and unsaturated sulfonic acids or an inorganic salt thereof (b), and
15 mol % to 78 mol % of hydroxyalkyl(meth)acrylate (c) having a hydroxyalkyl group having 2 to 4 carbon atoms.

2. A thermally crosslinkable slurry for a lithium-ion battery negative electrode, containing the thermally crosslinkable binder aqueous solution for a lithium-ion battery according to claim 1 and a negative electrode active material, and having a pH of 5 to 7.

3. The thermally crosslinkable slurry for a lithium-ion battery negative electrode according to claim 2, containing no particulate polymer.

4. A negative electrode for a lithium-ion battery, obtained by applying the thermally crosslinkable slurry for a lithium-ion battery negative electrode according to claim 2 to a current collector, and drying and curing the same.

5. A lithium-ion battery, comprising the negative electrode for a lithium-ion battery according to claim 4.

6. A lithium-ion battery negative electrode material, obtained by applying a thermally crosslinkable slurry for a lithium-ion battery negative electrode to a current collector and drying the same, wherein
the thermally crosslinkable slurry for a lithium-ion battery negative electrode contains a water-soluble poly(meth)acrylamide (A), water and a negative electrode active material, wherein the water-soluble poly(meth)acrylamide (A) is a polymer of a monomer group containing, with respect to 100 mol % of the monomer group,
2 mol % to 60 mol % of a (meth)acrylamide group-containing compound (a),
10 mol % to 50 mol % of one or more unsaturated acids selected from the group consisting of unsaturated carboxylic acids and unsaturated sulfonic acids or an inorganic salt thereof (b), and
15 mol % to 78 mol % of hydroxyalkyl(meth)acrylate (c) having a hydroxyalkyl group having 2 to 4 carbon atoms, wherein
a negative electrode active material layer comprising a dried product of the thermally crosslinkable slurry for a lithium-ion battery negative electrode has a water concentration of 0.3% to 1.0%, and the water-soluble poly(meth)acrylamide (A) after drying is not crosslinked.

7. The lithium-ion battery negative electrode material according to claim 6, wherein a gel fraction of the water-soluble poly(meth)acrylamide (A) after drying is 0% by mass to 20% by mass.

8. A method for producing a lithium-ion battery, comprising:
a drying step in which by heating at 60 C to 140 C a laminate having a laminate structure in which the lithium-ion battery negative electrode material according to claim 6, a separator, a positive electrode for a lithium-ion battery, and a separator are laminated in this order, the water concentration of the negative electrode active material layer is changed into 0.1% or less and the water-soluble poly(meth)acrylamide (A) is crosslinked until achieving a gel fraction of 70% by mass to 100% by mass.

9. The method for producing a lithium-ion battery according to claim 8, comprising an electrolytic solution injection step of injecting an electrolytic solution after the drying step.

10. The method for producing a lithium-ion battery according to claim 8, wherein the drying step is performed at 0.1 Pa to 100 Pa.

* * * * *